US011353129B2

(12) United States Patent
Goble

(10) Patent No.: US 11,353,129 B2
(45) Date of Patent: Jun. 7, 2022

(54) GAS VALVE ASSEMBLIES

(71) Applicant: Hubbell Incorporated, Shelton, CT (US)

(72) Inventor: Gregory Harlan Goble, Lake Forest, CA (US)

(73) Assignee: Hubbell Incorporated, Shelton, CT (US)

( * ) Notice: Subject to any disclaimer, the term of this patent is extended or adjusted under 35 U.S.C. 154(b) by 29 days.

(21) Appl. No.: 16/889,484

(22) Filed: Jun. 1, 2020

(65) Prior Publication Data

US 2020/0386338 A1    Dec. 10, 2020

Related U.S. Application Data

(60) Provisional application No. 62/858,512, filed on Jun. 7, 2019.

(51) Int. Cl.
*F16K 17/34* (2006.01)
*F16K 27/06* (2006.01)

(52) U.S. Cl.
CPC ............ *F16K 17/34* (2013.01); *F16K 27/065* (2013.01); *Y10T 137/7727* (2015.04)

(58) Field of Classification Search
CPC ... F16K 17/34; F16K 27/065; Y10T 137/7727
See application file for complete search history.

(56) References Cited

U.S. PATENT DOCUMENTS

| | | | | |
|---|---|---|---|---|
| 3,048,191 A * | 8/1962 | Crang | ................... | F16K 5/0407 137/625.32 |
| 4,624,443 A * | 11/1986 | Eidsmore | .............. | F16K 31/086 251/65 |
| 5,152,321 A * | 10/1992 | Drager | ................ | F16K 11/0856 137/625.29 |
| 6,488,047 B1 * | 12/2002 | Glover | .................... | F16K 17/28 137/460 |
| 6,688,333 B2 * | 2/2004 | McLane | ............ | B60H 1/00485 123/41.1 |
| 10,119,621 B2 * | 11/2018 | Breda | ...................... | E03C 1/023 |
| 2015/0219232 A1 * | 8/2015 | Dominguez | ............ | F16K 17/28 137/2 |
| 2016/0040585 A1 * | 2/2016 | Schaefer | ................... | F01P 3/20 137/1 |
| 2018/0372235 A1 * | 12/2018 | Smith | ................... | F16K 5/0471 |

* cited by examiner

*Primary Examiner* — Kevin R Barss
(74) *Attorney, Agent, or Firm* — Wissing Miller LLP

(57) ABSTRACT

The present disclosure provides gas valve assemblies that include a replaceable excess flow valve within a movable flow control body that is removably secured within a valve seat housing. The gas valve assemblies permit the replacement of an excess flow valve without interrupting the supply of gas to a structure and without replacing gas piping.

21 Claims, 16 Drawing Sheets

GAS VALVE ASSEMBLIES

CROSS REFERENCE TO RELATED APPLICATIONS

The present disclosure is based on and claims benefit from U.S. Provisional Patent Application Ser. No. 62/858,512 filed on Jun. 7, 2019 entitled "Gas Valve Assemblies" the contents of which are incorporated herein in their entirety by reference.

BACKGROUND

Field

The present disclosure relates to gas valve assemblies and, more particularly, to gas valve assemblies with an integrated excess flow valve.

Description of the Related Art

For convenience and safety, a main gas pipe supplying natural gas to structures, e.g. commercial buildings or residences, is typically installed underground, including under paved roadways and sidewalks, where it can be tapped to provide natural gas to one or more structures. The main gas pipe may also be referred to herein as the gas main, and the gas pipe tapped off the gas main may also be referred to herein as the service line or the service line gas pipe. A service line typically extends from the gas main and terminates at a gas meter/regulator mounted to or near the structure. For cost and convenience purposes, plastic, e.g., polyethylene, pipe may be used for the service line gas pipe. Although plastic piping is rather durable, there may be instances where the integrity of the plastic gas pipe may be compromised, such as natural disasters and human error or accident when digging in an area where gas pipes are buried. To avoid human accidents, procedures are generally required to be followed when digging in areas where the gas pipe may be buried. For example, in areas with buried gas pipes, utility service personnel, construction workers and homeowners digging the ground are urged to obtain information from the gas utility indicating exactly where gas pipes are located in order to avoid damaging the gas pipe. Unfortunately, accidents and/or natural events may still occur that can compromise the integrity of the gas pipe. For example, if for some reason the gas utility is not contacted to obtain the location of a gas pipe prior to excavation, directional drilling and/or post hole digging such excavation, drilling and/or digging may cause damage to the gas pipe. In addition, earthquakes and/or settling of the ground can damage the gas pipe. The integrity of the gas pipe and/or gas meter/regulator may also be compromised above ground by accidental regulator and/or service line failure or damage caused by an impact from a vehicle.

An excess flow valve (EFV) is a safety device generally installed within the service line gas pipe to limit the volume of natural gas that can leak into the atmosphere if the integrity of the service line gas pipe is compromised downstream of the excess flow valve. An excess flow valve is a self-actuating valve that automatically closes when the gas flow through the service line gas pipe exceeds a predetermined flow rate. Depending on its configuration, the excess flow valve may automatically reset or may require manual reset once the source of the gas leak is repaired. Generally, the excess flow valve is positioned in the service line gas pipe in close proximity to the gas main so that substantially the entire length of the service line gas pipe is protected by the excess flow valve.

Current federal code requires the use of an excess flow valve in the service line gas pipe rated for single family residence structures operating at pressures greater than or equal to 10 pounds per square inch gage or 10 psig and in multi-family residences or single small commercial customers operating at pressures greater than or equal to 10 psig and with a demand flow less than or equal to 1000 standard cubic feet per hour or 1000 SCFH installed meter capacity. As noted above, conventional excess flow valves are installed within the service line gas pipe. All other services require a manual shut off valve which does not provide automatic actuation. To remove or change an excess flow valve installed within the service line gas pipe, the ground has to be excavated and the excess flow valve cut-out of the service line gas pipe and a new service line gas pipe with a new excess flow valve has to be installed. The cost to replace an excess flow valve may be high and the traffic disruption associated with the replacing the excess flow valve may be significant. As a result, the flow rate of excess flow valves is typically rated for the maximum potential demand flow associated with the potential uses of the structure when the excess flow valve is originally installed. This predetermined rating of the excess flow valve is sized for a particular set of conditions, such as the inlet pressure, the maximum possible demand flow and the size of the service line gas pipe. The problem is that for utilities that supply natural gas to commercial and residential structures, the expected demand flow can change appreciably over time. For example, at one point in time the structure may be a pizza restaurant with a high demand flow, and at later point in time the structure may be a florist with a different and lower demand flow. Thus, in the example described above, the excess flow valve would have a predetermined flow rate suitable for a pizza restaurant. When the structure is transformed into a florist, the demand flow will drop appreciably. As a result, the excess flow valve may not provide the intended flow protection for a florist. More specifically, the service line gas pipe has an excess flow valve rated for a high flow rate to meet the demand of the pizza restaurant flow. However, the flow rate of a florist is appreciably lower. As a result, small leaks in the service line gas pipe may not trigger the excess flow valve to automatically shut off the gas flow in the service line as that leak may not exceed the flow rate of the excess flow valve.

The gas valve assemblies according to the present disclosure include a replaceable excess flow valve within a movable flow control body removably secured to a valve seat housing that permits the replacement of the excess flow valve without interrupting the supply of gas to the structure and without replacing gas pipe. For example, the gas valve assembly according to the present disclosure would permit the replacement of an excess flow valve of one demand flow rating with an excess flow valve of another demand flow rating without interrupting the supply of gas to the structure and without replacing gas pipe and without need for excavation with the proper application of valve box installation. As another example, the gas valve assembly according to the present disclosure would permit the replacement of an old or non-operational excess flow valve with a fully operational excess flow valve without interrupting the supply of gas to the structure and without replacing gas pipe and without need for excavation with the proper application of valve box installation.

SUMMARY

The present disclosure provides exemplary embodiments of gas valve assemblies that include a replaceable excess flow valve within a movable flow control body that is removably secured within a valve seat housing. The gas valve assemblies according to the present disclosure permit the replacement of an excess flow valve without interrupting the supply of gas to a structure and without the need to replace gas piping and without need for excavation with the proper application of valve box installation.

In one exemplary embodiment, a gas valve assembly includes a valve seat housing, a flow valve body and a valve holding assembly. The valve seat housing has a wall and a central opening. The valve seat housing also includes a first hub, a first gas port, a second hub, a second gas port. The first hub extends from the wall of the valve seat housing and has an opening extending therethrough. The first gas port extends through the wall of the valve seat housing and is aligned with the first hub opening so that the central opening is in communication with the first hub opening. The second hub extends from the wall of the valve seat housing and has an opening extending therethrough. The second gas port extends through the wall of the valve seat housing and is aligned with the second hub opening so that the central opening is in communication with the second hub opening. The flow valve body is positioned within the central opening of the valve seat housing. The flow valve body has a main flow bore extending therethrough and a bypass bore extending therethrough. The main flow bore is angularly displaced from the bypass flow bore. The valve holding assembly has a lid releasably secured to the flow valve body and a valve holding body extending from the lid into a valve receptacle within the flow valve body. The valve holding body has an excess flow valve removably positioned within an EFV bore within the valve holding body. The gas valve assembly may also include a cover ring releasably securing the flow valve body within the central opening of the valve seat housing.

In another exemplary embodiment, a gas valve assembly includes a valve seat housing and a flow valve body. The valve seat housing has a wall and a central opening. The valve seat housing includes a first hub, a first gas port, a second hub and a second gas port. The first hub is integrally or monolithically formed into the wall of the valve seat housing and has an opening extending therethrough. The first gas port extends through the wall of the valve seat housing and is aligned with the first hub opening so that the central opening is in communication with the first hub opening. The second hub is integrally or monolithically formed into the wall of the valve seat housing and has an opening extending therethrough. The second gas port extends through the wall of the valve seat housing and is aligned with the second hub opening so that the central opening is in communication with the second hub opening. The flow valve body is positioned within the central opening of the valve seat housing. The flow valve body has a main flow bore extending therethrough and a bypass bore extending therethrough. The main flow bore is angularly displaced from the bypass flow bore. The flow valve body has a removable excess flow valve positioned within main flow bore. The gas valve assembly may also include a cover ring releasably securing the flow valve body within the central opening of the valve seat housing.

In another exemplary embodiment, a gas valve assembly includes a valve seat housing and a flow valve body. The valve seat housing has a wall and a central opening and includes a first gas port and a second gas port. The first gas port and the second gas port extend through the wall of the valve seat housing. The flow valve body is positioned within the central opening of the valve seat housing. The flow valve body has a main flow bore extending therethrough and a bypass bore extending therethrough, where the main flow bore is angularly displaced from the bypass flow bore. The flow valve body also includes a removable excess flow valve positioned within the main flow bore. The gas valve assembly may also include a valve holding assembly having a lid releasably secured to the flow valve body. The valve holding body extends from the lid into a valve receptacle within the flow valve body. In this exemplary embodiment, the excess flow valve is removably positioned within an EFV bore within the valve holding body. The gas valve assembly may also include a cover ring releasably securing the flow valve body within the central opening of the valve seat housing.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure provides exemplary embodiments of gas valve assemblies that include a replaceable excess flow valve within a movable flow control body that is removably secured within a valve seat housing. The gas valve assemblies according to the present disclosure permit the replacement of an excess flow valve without interrupting the supply of gas to a structure and without the need to replace gas piping and without need for excavation with the proper application of valve box installation. For example, the gas valve assemblies permit the replacement of an excess flow valve designed for one demand flow rating trip flow, e.g., 3900 Standard Cubic Feet Per Hour (SCFH), with an excess flow valve designed for another demand flow rating trip flow, e.g., 1100 SCFH, without interrupting the supply of gas and without replacing gas pipe. As another example, the gas valve assemblies permit the replacement of an inoperable excess flow valve without interrupting the supply of gas to the structure and without replacing gas piping and without need for excavation with the proper application of valve box installation.

The gas valve assemblies according to the present disclosure include multiple gas flow bores that are isolated from each other by internal seals and by having longitudinal axes that are orientated with an angular displacement so that only one gas flow bore is operatively aligned with first and second gas flow ports of the valve seat housing. The operative alignment allows the gas valve assemblies to be oriented to operate in multiple modes, such as a flow control mode, a bypass mode and an off mode. The flow control mode is a mode of operation of the gas valve assembly where a flow bore with the excess flow valve is aligned with the first and second gas flow ports of the valve seat housing. The bypass mode is a mode of operation of the gas valve assembly where a flow bore without the excess flow valve is aligned with the first and second gas flow ports of the valve seat housing. The off mode is a mode of operation of the gas valve assembly where no flow bore is aligned with the first and second gas flow ports of the valve seat housing so that gas does not flow from the first gas flow port to the second gas flow port.

For ease of description, the gas valve assemblies may also be referred to herein as the "valve assemblies" in the plural and the "valve assembly" in the singular. The excess flow valves that are included in the valve assemblies may also be referred to herein as the "EFV's" in the plural and the "EFV" in the singular.

Figure 1:
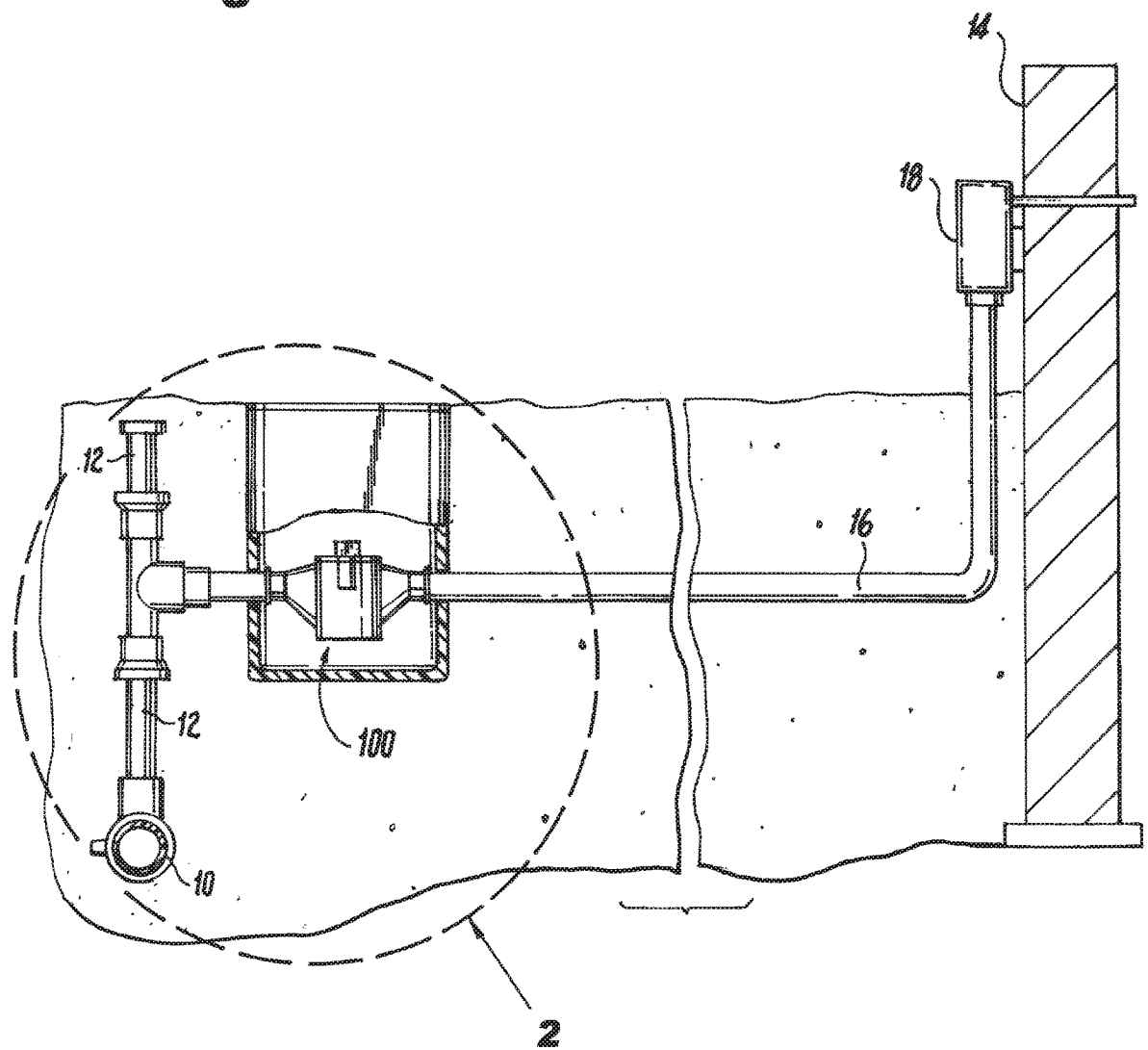
FIG. 1 is an illustration of an exemplary gas supply environment where the gas valve assemblies according to the present disclosure may be utilized.
Figure 2:
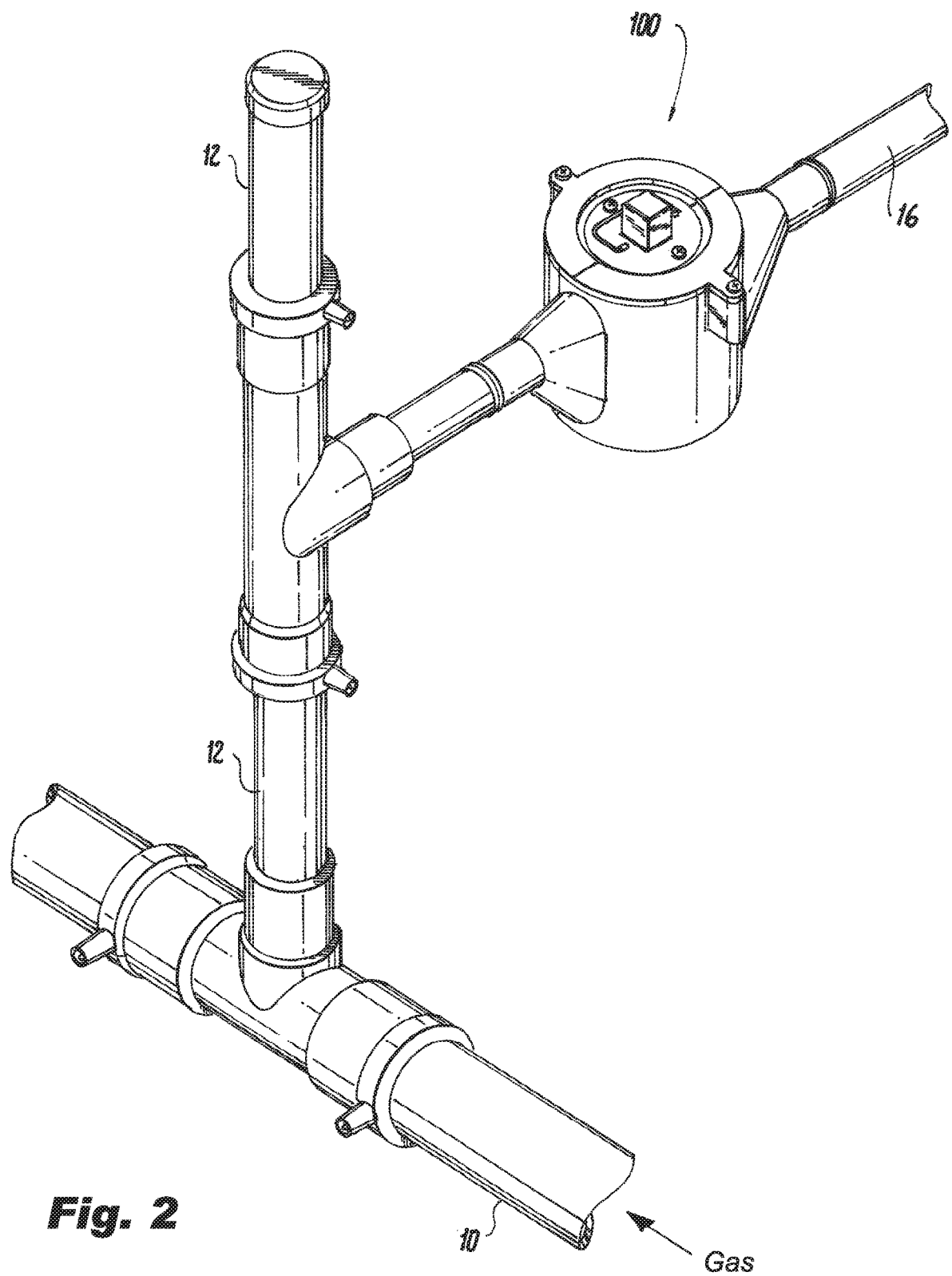
FIG. 2 is a perspective view of an exemplary embodiment of a gas valve assembly according to the present disclosure installed within the gas supply environment of FIG. 1.

As shown in FIGS. 1 and 2, the valve assemblies 100 of the present disclosure are connected to a tee connection 12 extending from a gas main 10 supplying natural gas to a structure 14 via service line gas piping 16 extending between the tee connection 12 and a gas meter/regulator 18 mounted to or near the structure 14. The service line gas piping 16 described herein is preferably made of a plastic material, such as polyethylene. However, it will be appreciated that the service line gas piping may be made of any suitable material or materials capable of transporting gas from the gas main 10 to the gas meter/regulator 18 mounted to or near the structure 14.

Figure 3:
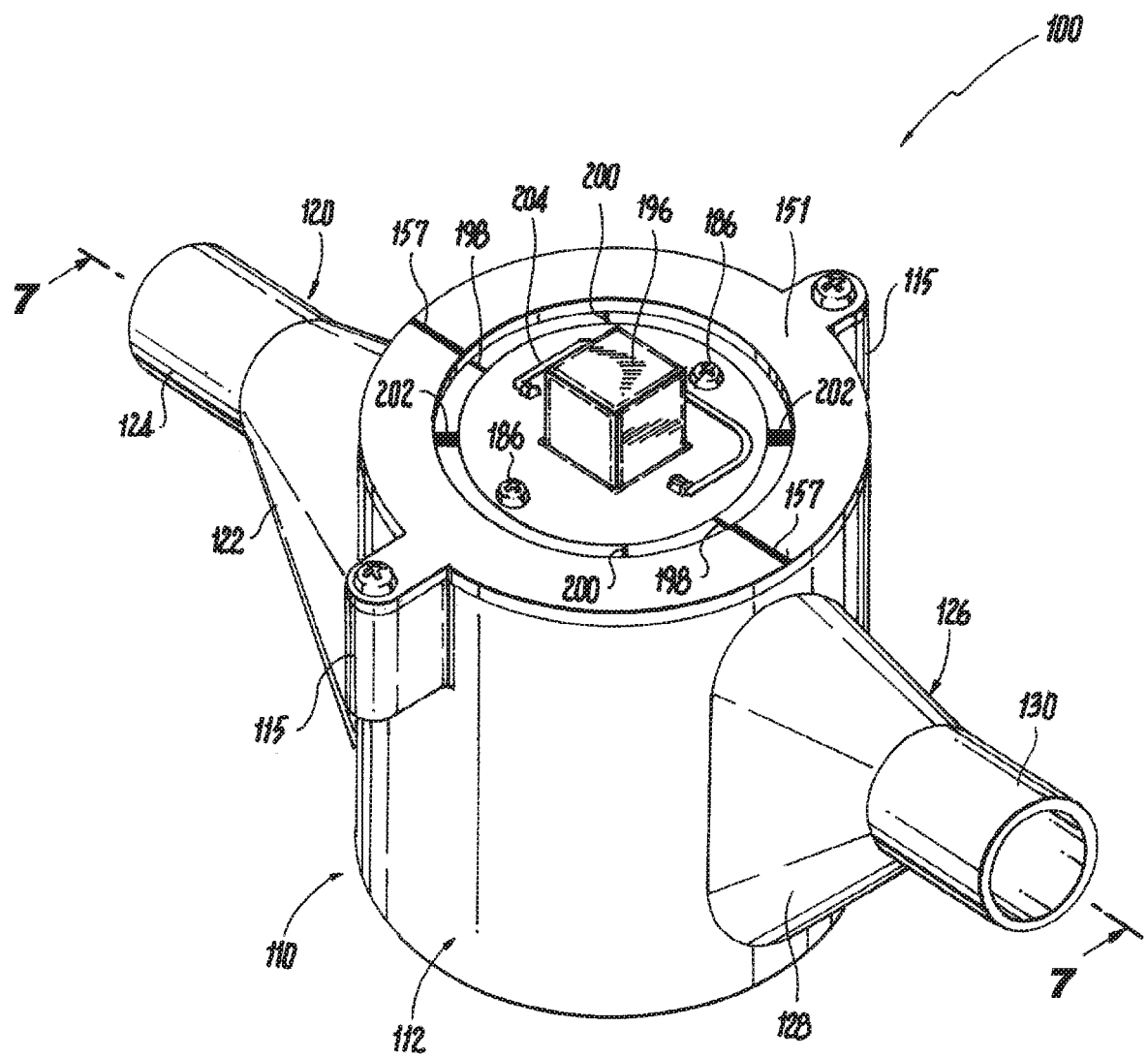
FIG. 3 is a perspective view of an exemplary embodiment of a gas valve assembly according to the present disclosure.
Figure 4:
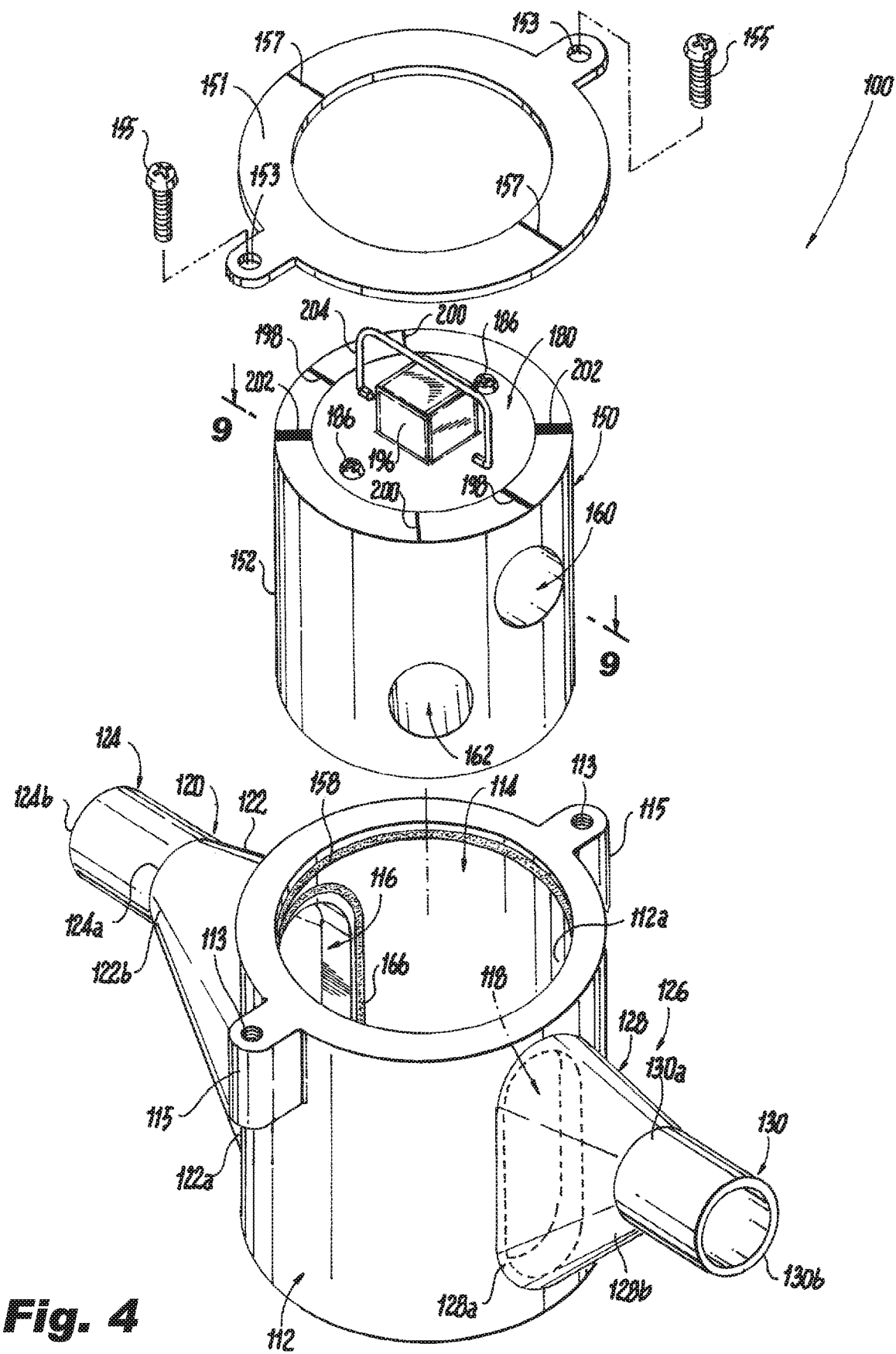
FIG. 4 is an exploded perspective view of the gas valve assembly of FIG. 3, illustrating a valve seat housing and a flow control body that can be removably secured to the valve seat housing.
Figure 5:
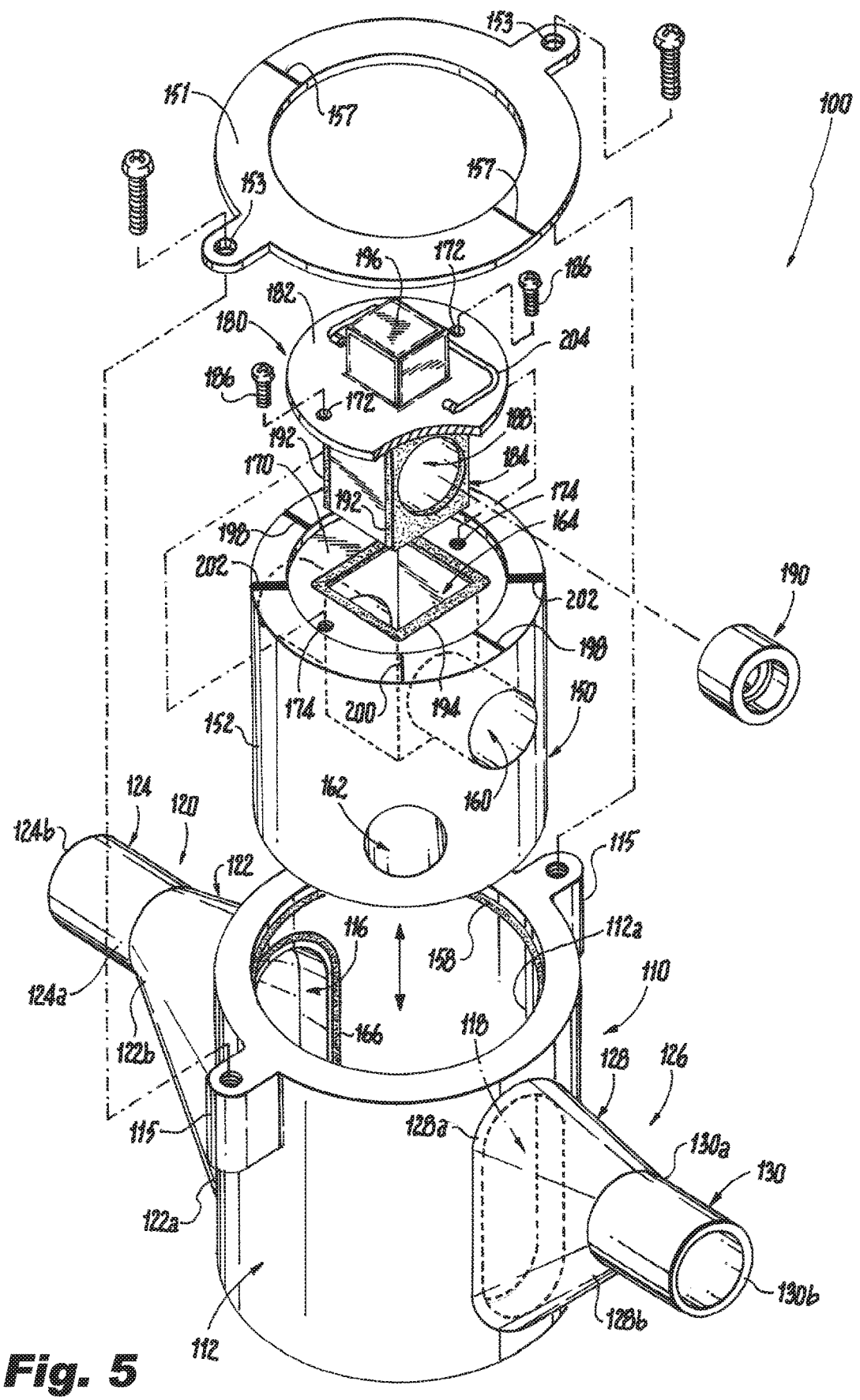
FIG. 5 is an exploded perspective view of the gas valve assembly of FIG. 4, illustrating the valve seat housing, the flow control body, and a valve holding assembly that can be removably secured to the flow control body and that can hold an excess flow valve so that the excess flow valve is aligned with a main bore within the flow control body.

Referring to FIGS. 3-5, an exemplary embodiment of a valve assembly 100 according to the present disclosure is shown. The valve assembly 100 includes a valve seat housing 110, a flow valve body 150 and a valve holding assembly 180. In this exemplary embodiment, the valve seat housing 110 is a generally cylindrical member or structure that is preferably made of a plastic material, such as polyethylene. The valve seat housing 110 includes a wall 112 with a central opening 114, seen in FIG. 4, that is configured to receive the flow valve body 150. In this exemplary embodiment, the wall 112 of the valve seat housing 110 is a cylindrical wall. A first gas port 116 extends through the wall 112 and a second gas port 118 extends through the wall 112. The gas ports 116 and 118 can be used as inlet and outlet ports for the flow of gas. For example, the gas port 116 can be an inlet port connected to the gas main 10 and the gas port 118 can be an outlet port connected to the service line gas piping 16. However, the present disclosure also contemplates that the first gas port 116 can be an outlet port connected to the service line gas piping 16 and the second gas port 118 can be an inlet port connected to the gas main 10. In this exemplary embodiment, the first and second gas ports 116 and 118 are elongated openings in the wall 112 of the valve seat housing 110, as shown FIGS. 4 and 7.

Continuing to refer to FIGS. 3-5, extending from the valve seat housing 110 is a first hub 120 that is aligned with the first gas port 116, and a second hub 126 that is aligned with the second gas port 118. The first hub 120 is a hollow member that includes an elongated portion 122 having a hollow center and a nipple portion 124 having a hollow center. The elongated portion 122 has a first end 122a that may be integrally or monolithically formed into the wall 112 of the valve seat housing 110 so that a sealed connection joint exists between the first hub 120 and the valve seat housing 110 preventing gas from exiting the valve seat housing via the sealed connection joint. In another embodiment, the first end 122a of the elongated portion 122 may be secured to the wall 112 of the valve seat housing 110 using adhesives, welds or other fasteners, so that a sealed connection joint exists between the first hub 120 and the valve seat housing 110 preventing gas from exiting the valve seat housing via the sealed connection joint. The first end 122a of the elongated portion 122 is preferably shaped so that the hollow center portion of the elongated portion 122 is substantially the same shape and size as the first gas port 116. A second end 122b of the elongated portion 122 is narrower than the first end 122a and is shaped so that the second end 122b can be coupled to the nipple portion 124. The nipple portion 124 has a first end 124a coupled to or monolithically formed into the second end 122b of the elongated portion 122 and a second free end 124b. In the exemplary embodiment of FIGS. 3-5, the nipple portion 124 is a cylindrical length of pipe where the first end 124a of the nipple portion 124 is coupled to the second end 122b of the elongated portion 122 of the first hub 120 so that a sealed connection joint exists between the elongated portion 122 and the nipple portion 124 preventing gas from exiting the valve seat housing 110 via the sealed connection joint. The second end 124b of the nipple portion 124 of the first hub 120 can be coupled to a gas pipe or a gas pipe fitting, e.g., the service line gas pipe 16 or the tee connection 12 extending from the gas main 10.

Continuing to refer to FIGS. 3-5, the second hub 126 may be substantially the same size and shape as the first hub 120 or the second hub 126 may be different in shape and size from the first hub 120. In this exemplary embodiment, second hub 126 is substantially the same size and shape as the first hub 120. The second hub 126 is a hollow member that includes an elongated portion 128 having a hollow center and a nipple portion 130 having a hollow center. The elongated portion 128 has a first end 128a that may be integrally or monolithically formed into the wall 112 of the valve seat housing 110 so that a sealed connection joint exists between the second hub 126 and the valve seat housing 110 preventing gas from exiting the valve seat housing via the sealed connection joint. In another embodiment, the first end 128a of the elongated portion 128 may be secured to the wall 112 of the valve seat housing 110 using adhesives, welds or other fasteners, so that a sealed connection joint exists between the second hub 126 and the valve seat housing 110 preventing gas from exiting the valve seat housing via the sealed connection joint. The first end 128a of the elongated portion 128 is preferably shaped so that the hollow center portion of the elongated portion 128 is substantially the same shape and size as the second gas port 118. A second end 128b of the elongated portion 128 is narrower than the first end 128a and is shaped so that the second end 128b can be coupled to the nipple portion 130. The nipple portion 130 has a first end 130a coupled to or monolithically formed into the second end 128b of the elongated portion 128 and a second free end 130b. In the exemplary embodiment of FIGS. 3-5, the nipple portion 130 is a cylindrical length of pipe where the first end 130a of the nipple portion 130 is coupled to the second end 128b of the elongated portion 128 of the second hub 126 so that a sealed connection joint exists between the elongated portion 128 and the nipple portion 130 preventing gas from exiting the valve seat housing 110 via the sealed connection joint. The second end 130b of the nipple portion 130 of the second hub 126 can be coupled to a gas pipe or a gas pipe fitting, e.g., the service line gas pipe 16 or the tee connection 12 extending from the gas main 10.

Referring to FIGS. 4-7, the flow valve body 150 includes a substantially solid outer wall 152 that is configured and dimensioned to fit within the central opening 114 in the valve seat housing 110. In this exemplary embodiment, the flow valve body 150 is a generally cylindrical member or structure that is preferably made of a plastic material, such as polyethylene. The flow valve body 150 is releasably secured within the central opening of the valve seat housing 110 using, for example, a cover ring 151 having mounting holes 153 and mechanical fasteners 155, e.g., machine screws, that are secured to threaded apertures 113 in mounting blocks 115 of the valve seat housing 110.

In this exemplary embodiment, the wall 112 of the valve seat housing 110 is a cylindrical wall and the outer wall 152 of the flow valve body 150 is cylindrical in shape and dimensioned so that the diameter of the outer wall 152 is less than a diameter of the central opening 114 in the valve seat housing 110. To ensure a gas tight seal between the outer wall 152 of the flow valve body 150 and an inner wall 112a of the wall 112 of the valve seat housing 110, one or more sealing members can be secured at least partially within the inner wall 112a of the wall 112 so that a portion of the one or more sealing members 156 and 158 can engage the outer wall 152 of the flow valve body 150 to seal gas within the valve seat housing 110. In another exemplary embodiment, the one or more sealing members 156 and 158 can be secured at least partially within the outer wall 152 of the flow valve body 150 so that a portion of the one or more sealing members 156 and 158 can engage the inner wall 112a of the wall 112 of the valve seat housing 110 to seal gas within the valve seat housing 110. Non-limiting examples of the sealing members include O-rings and gaskets. In the exemplary embodiment of FIGS. 4-7, the one or more sealing members include sealing member 158 which is secured at least partially within the inner wall 112a of the wall 112 so that a portion of the sealing members 156 and 158 can engage the outer wall 152 of the flow valve body 150, as seen in FIG. 7.

Figure 6:
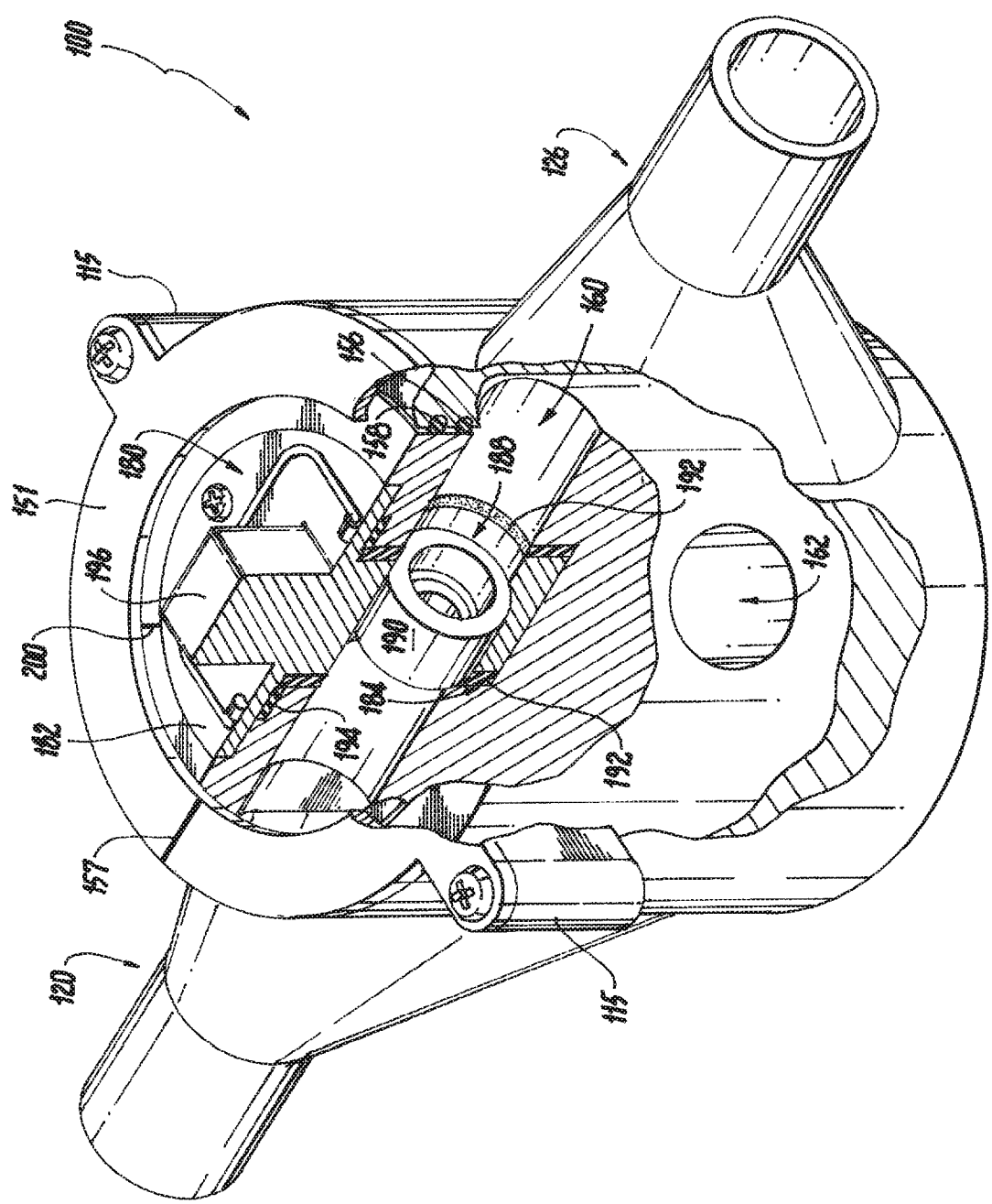
FIG. 6 is a perspective view of the gas valve assembly of FIG. 3 in partial cut away revealing the excess flow valve within the valve holding assembly and within the main bore of the flow control body aligned for operation in a flow control mode.

As noted above, the gas valve assemblies 100 according to the present disclosure also include multiple gas flow bores that are isolated from each other by internal seals and by having longitudinal axes that are orientated with an angular displacement so that only one gas flow bore is operatively aligned with first and second gas flow ports 116 and 118 of the valve seat housing 110. In the exemplary embodiment of FIGS. 4-9, the flow valve body 150 includes a main flow bore 160 and a bypass flow bore 162. The main flow bore 160 extends along a longitudinal axis "L1", seen in FIG. 9, from one side of the wall 152 of the flow valve body 150 through the flow valve body to an opposite side of the wall 152. In this exemplary embodiment, the flow valve body 150 includes a valve receptacle 164 that extends into the flow valve body 150 and intersects the main flow bore 160, as shown in FIGS. 5 and 6. The valve receptacle 164 is configured and dimensioned to receive a valve holding body 184 of the valve holding assembly 180 described in more detail below.

Figure 9:
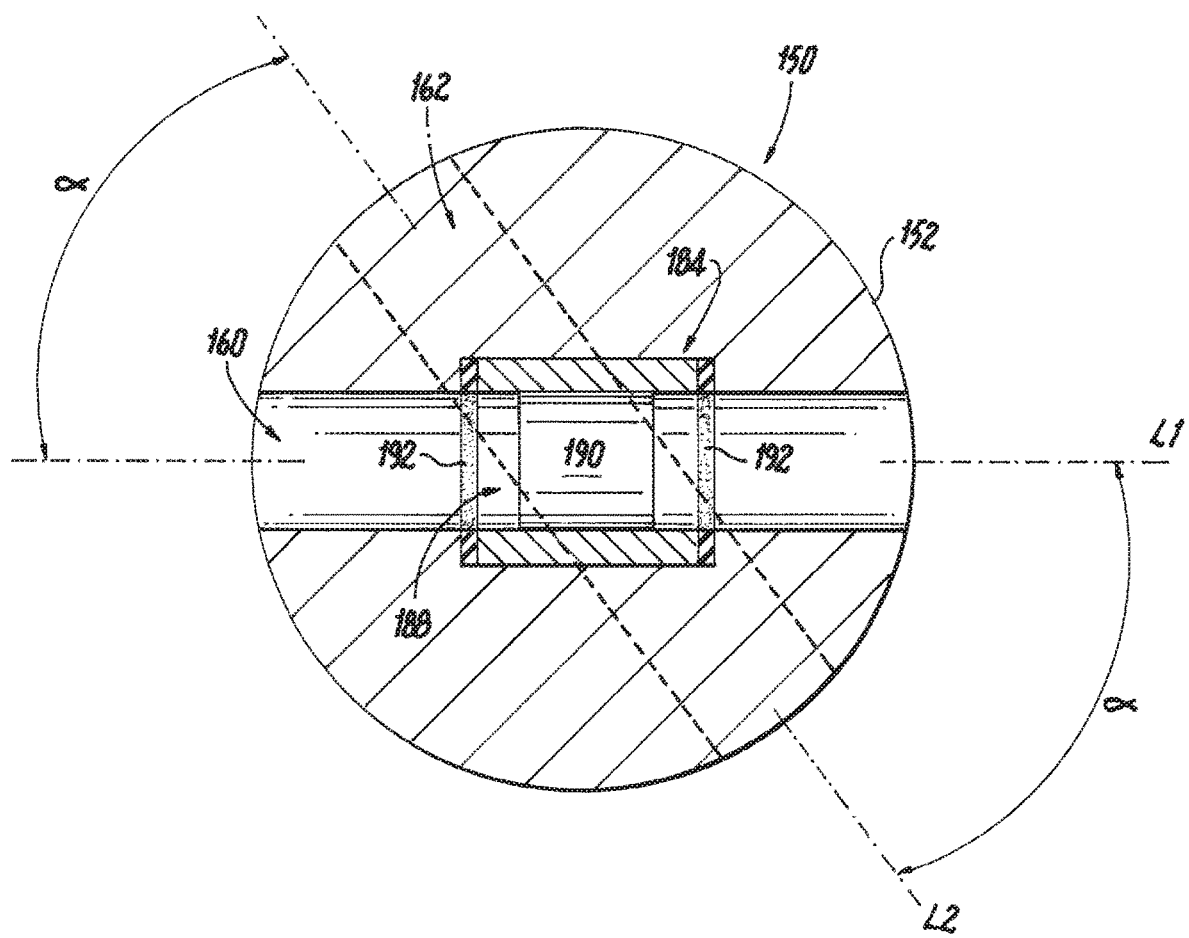
FIG. 9 is cross-sectional view of the gas valve assembly of FIG. 4 taken from line 9-9, illustrating an angular displacement between the main flow bore within the flow control body and a bypass flow bore within the flow control body.
Figure 10:
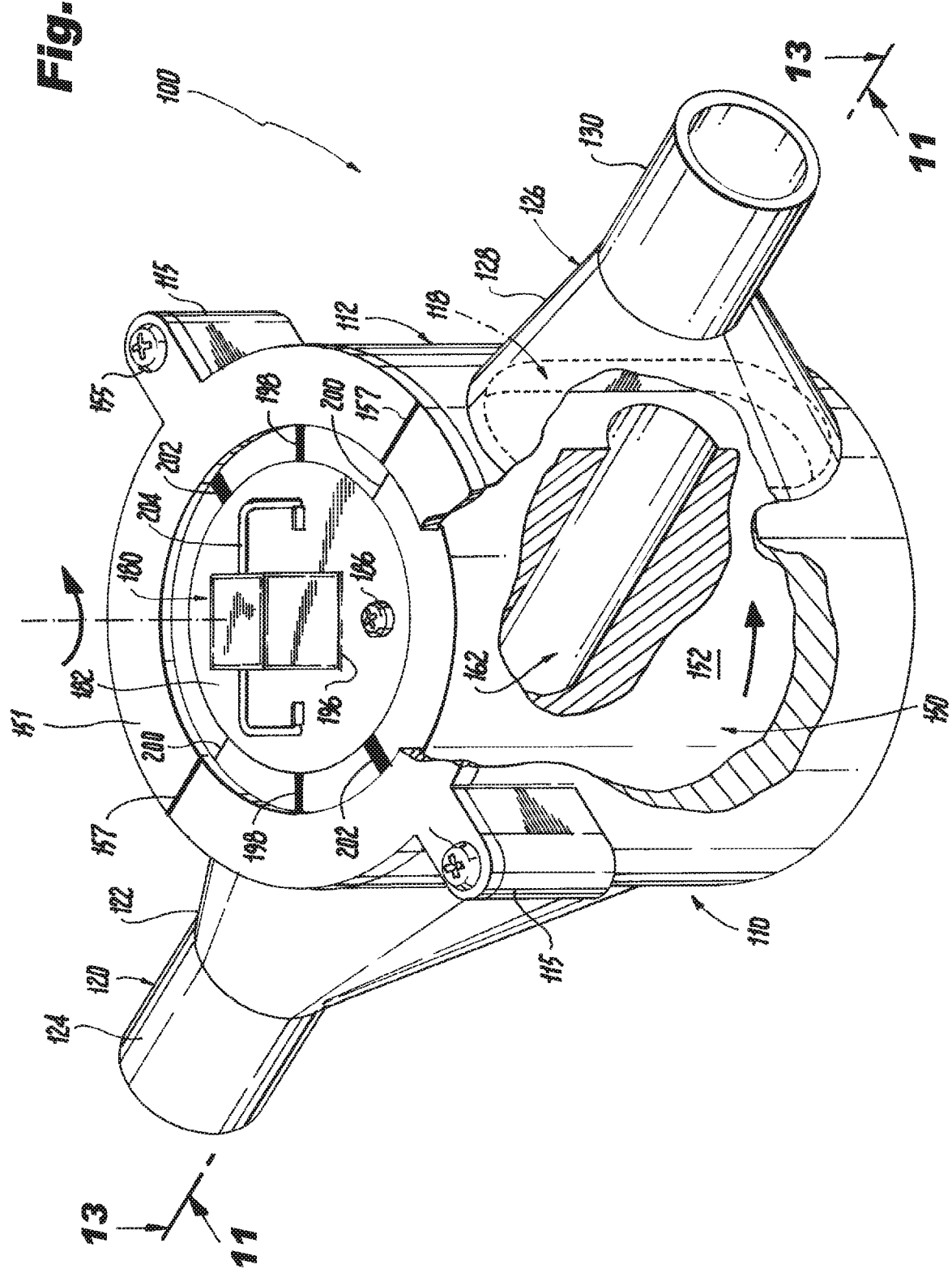
FIG. 10 is a perspective view of the gas valve assembly of FIG. 3 in partial cut away revealing the bypass flow bore within the flow control body and the flow control body rotated and aligned for operation in a bypass mode.
Figure 11:
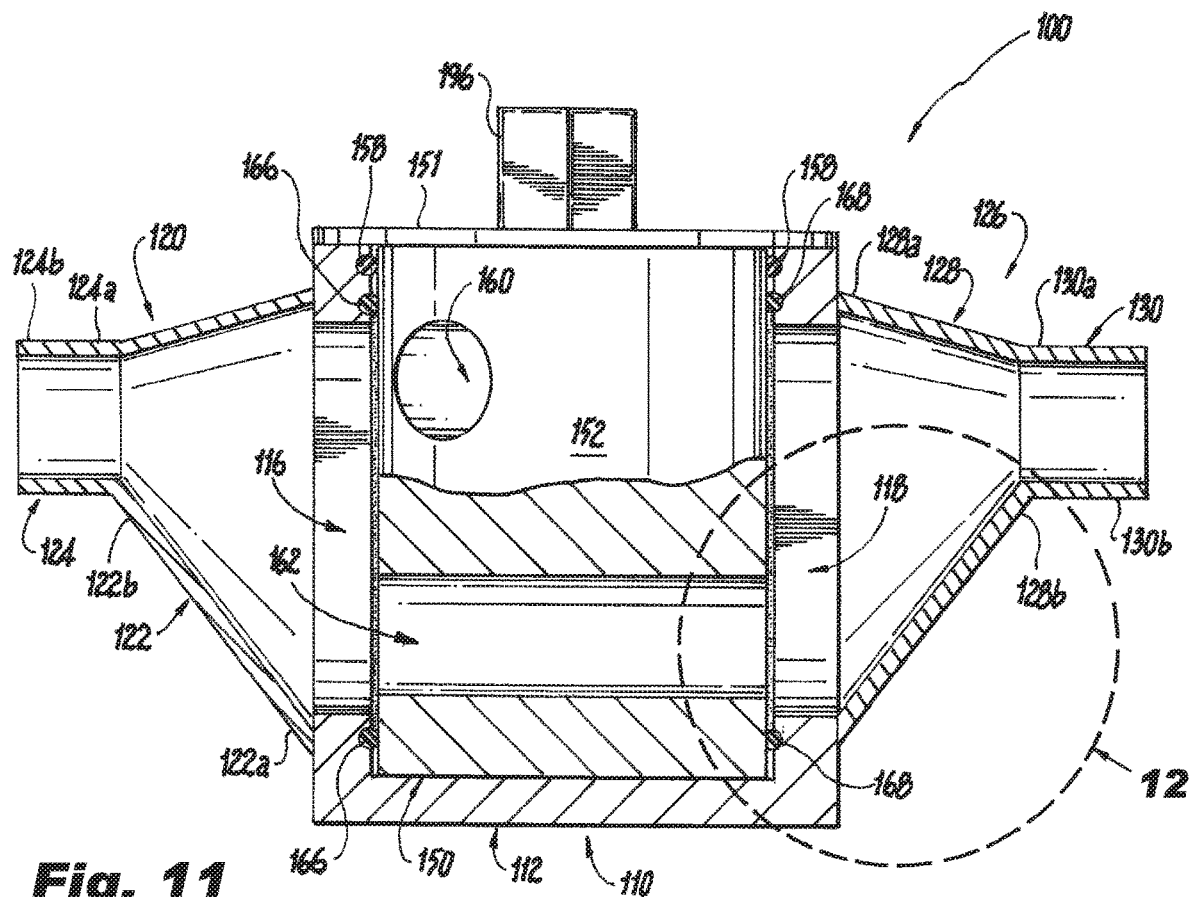
FIG. 11 is a side elevation view of the gas valve assembly of FIG. 10 with a partial cut away taken from line 11-11, illustrating the bypass flow bore within the flow control body and the flow control body rotated and aligned for operation in the bypass mode.
Figure 12:
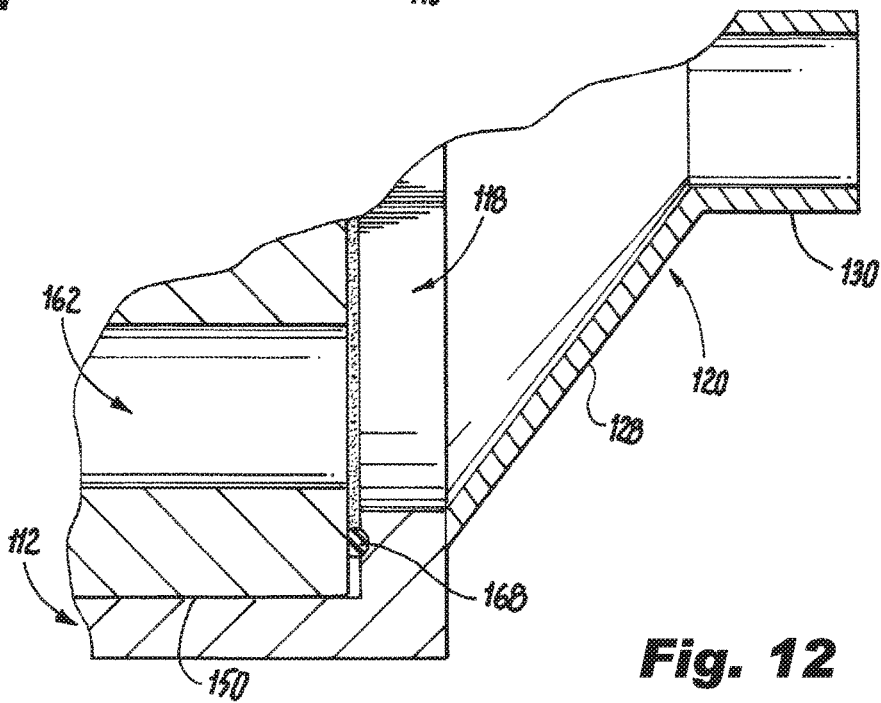
FIG. 12 is an enlarged view of a portion of the gas valve assembly of FIG. 11 taken from detail 12 and illustrating a sealed junction between the bypass flow bore within the flow control body and a gas port of the valve seat housing.
Figure 13:
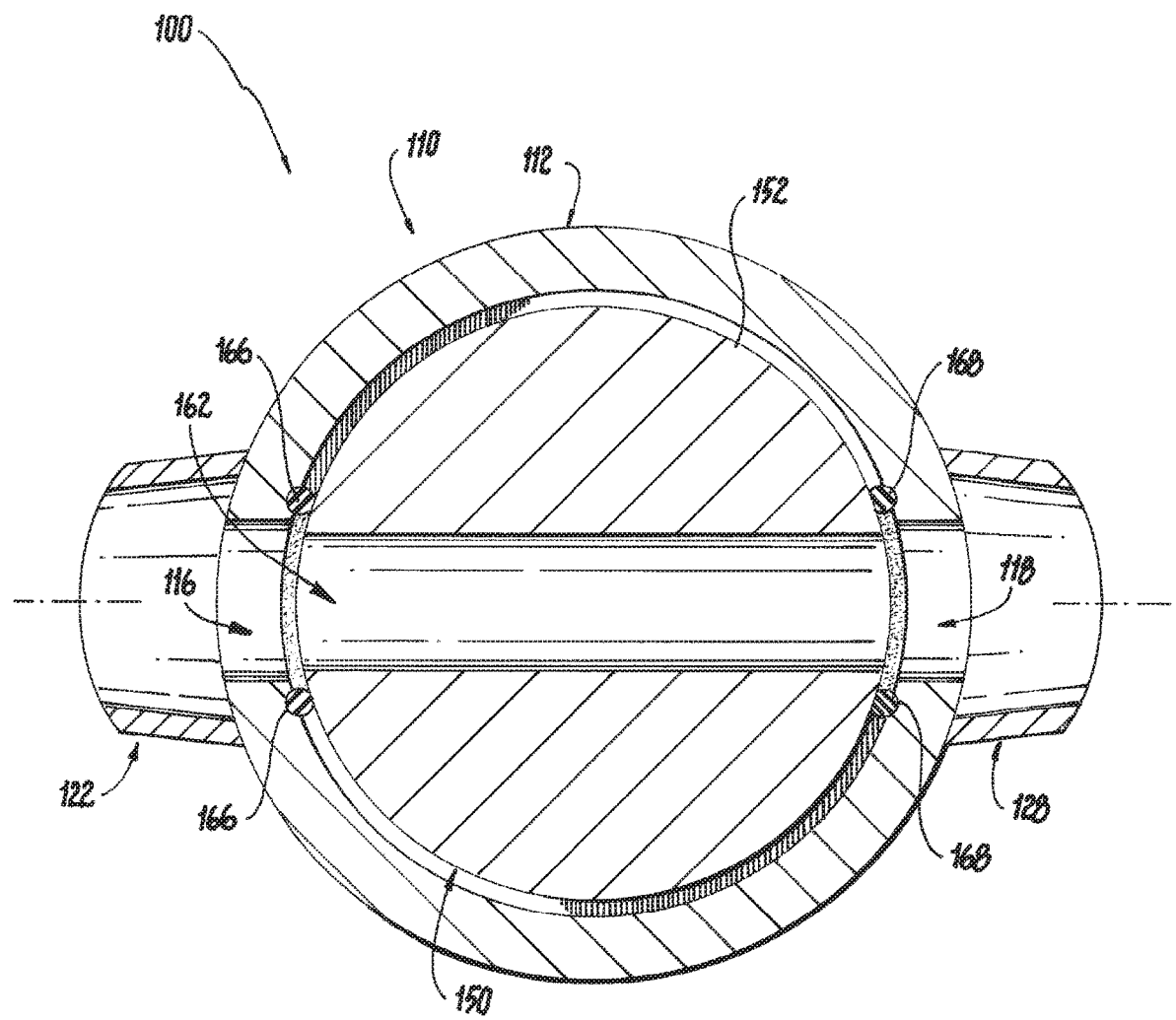
FIG. 13 is cross-sectional view of the gas valve assembly of FIG. 10 taken from line 13-13, illustrating the bypass flow bore within the flow control body and the flow control body aligned for operation in the bypass mode.

The bypass flow bore 162 extends along a longitudinal axis "L2", seen in FIG. 9, from one side of the wall 152 of the flow valve body 150 through the flow valve body to an opposite side of the wall 152. As seen in FIG. 9, the bypass flow bore 162 is oriented relative to the main flow bore 160 so that the longitudinal axes L1 and L2 are orientated with an angular displacement "a." The angular displacement should be sufficient so flow bore 160 and 162 can be operatively engaged with first and second gas flow ports 120 and 126 of the valve seat housing 110 while transitioning from one position to another and sufficient so only one flow bore 160 or 162 is operatively aligned with first and second gas flow ports 120 and 126 of the valve seat housing 110 when in EFV flow bore position or bypass flow bore position. As a non-limiting example, the angular displacement "a" may be in the range of about 50 degrees and about 70 degrees.

Figure 7:
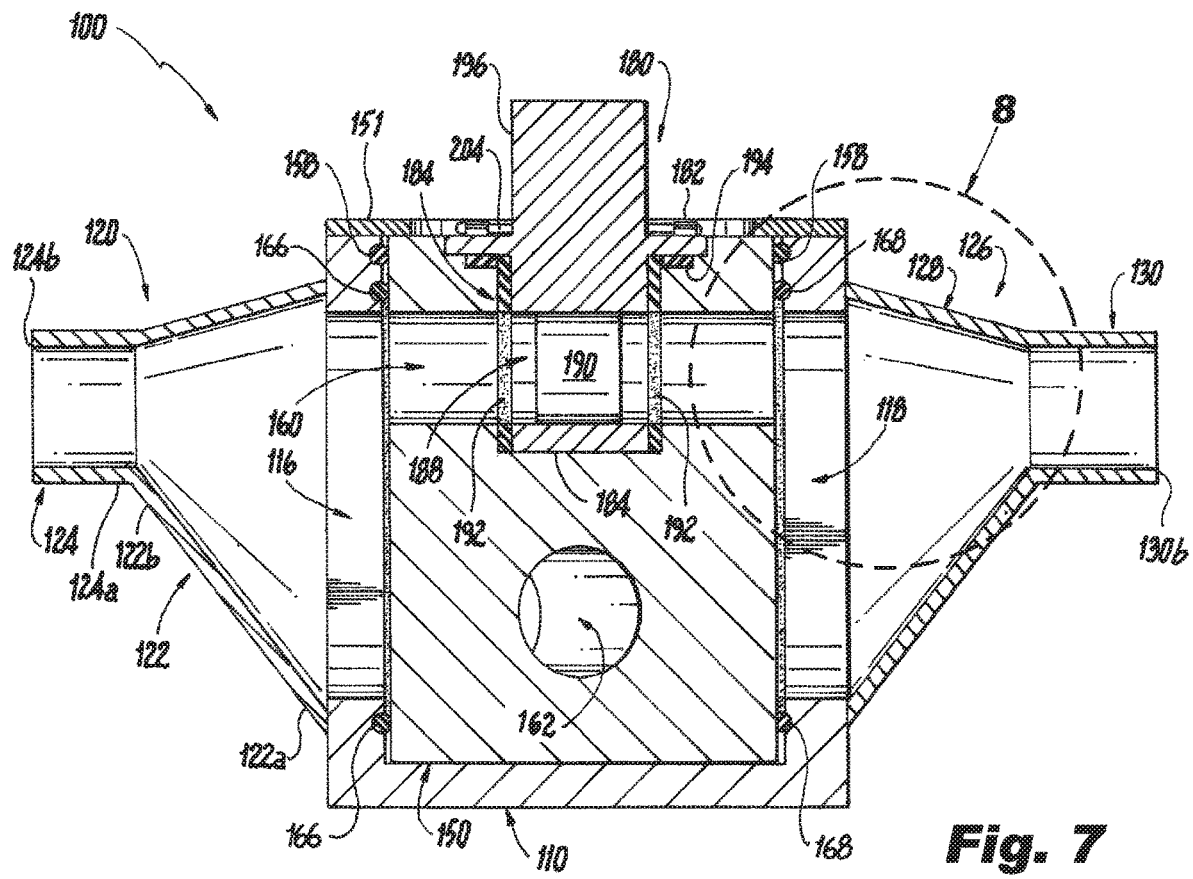
FIG. 7 is a cross-sectional view of the gas valve assembly of FIG. 3 taken from line 7-7, illustrating the excess flow valve within the valve holding assembly and within the main bore of the flow control body aligned for operation in a flow control mode.

Referring to FIGS. 5 and 7, to ensure a gas tight seal between the main flow bore 160 or the bypass flow bore 162, and the first hub 120, one or more sealing members 166 can be used. The one or more sealing members 166 may be secured to the inner wall 112a of the wall 112 of the valve seat housing 110 or they may be secured to the outer wall 152 of the flow valve body 150 around the main flow bore 160 and the bypass flow bore 162. Non-limiting examples of the sealing members 166 include O-rings and gaskets. In the exemplary embodiment shown in FIGS. 5 and 7, one sealing member 166 is secured at least partially to or within the inner wall 112a around the first gas port 116 so that a portion of the one or more sealing members 166 can engage the outer wall 152 of the flow valve body 150 in the proximity of the main flow bore 160 or the bypass flow bore 162 to seal gas within the respective bore and/or within the first hub 120. More specifically, when the flow valve body 150 is aligned for operation in the flow control mode, the main flow bore 160 is aligned with the first gas port 116 so that the sealing member 166 prevents gas flowing between the first hub 120, the first gas port 116 and the main flow bore 160 from leaking into the valve seat housing 110. When the flow valve body 150 is aligned for operation in the bypass mode, the bypass flow bore 162 is aligned with the first gas port 116 so that the sealing member 166 prevents gas flowing between the first hub 120, the first gas port 116 and the bypass flow bore 160 from leaking into the valve seat housing 110. When the flow valve body 150 is aligned for operation in the off mode, neither the main flow bore 160 nor the bypass flow bore 162 are aligned with the first gas port 116 so that the sealing member 166 prevents gas from flowing out of or into the first hub 120 and the first gas port 116.

Figure 8:
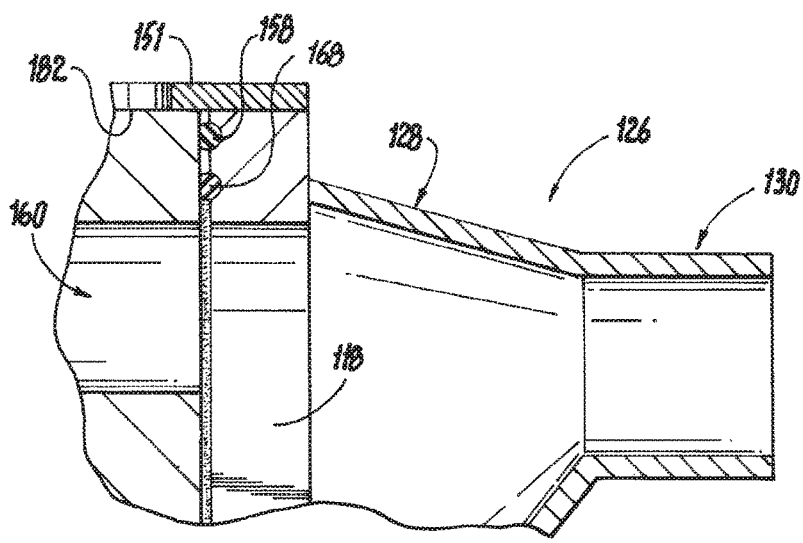
FIG. 8 is an enlarged view of a portion of the gas valve assembly of FIG. 7 taken from detail 8 and illustrating a sealed junction between the main bore within the flow control body and a gas port of the valve seat housing.

Referring to FIGS. 5, 7 and 8, to ensure a gas tight seal between the main flow bore 160 or the bypass flow bore 162, and the second hub 126, one or more sealing members 168 can be used. The one or more sealing members 168 may be secured to the inner wall 112a of the wall 112 of the valve seat housing 110 or they may be secured to the outer wall 152 of the flow valve body 150 around the main flow bore 160 and the bypass flow bore 162. Non-limiting examples of the sealing members include O-rings and gaskets. In the exemplary embodiment shown in FIGS. 5, 7 and 8, one sealing member 168 is secured at least partially to or within the inner wall 112a around the second gas port 118 so that a portion of the sealing member 168 can engage the outer wall 152 of the flow valve body 150 in the proximity of the main flow bore 160 or the bypass flow bore 162 to seal gas within the respective bore 160 and/or 162 and/or within the second hub 126. More specifically, when the flow valve body 150 is aligned for operation in the flow control mode, the main flow bore 160 is aligned the second gas port 118 so that the sealing member 168 prevents gas flowing between the second hub 126, the second gas port 118 and the main flow bore 160 from leaking into the valve seat housing 110. When the flow valve body 150 is aligned for operation in the bypass mode, the bypass flow bore 162 is aligned the second gas port 118 so that the sealing member 168 prevents gas flowing between the second hub 126, the second gas port 118 and the bypass flow bore 160 from leaking into the valve seat housing 110. When the flow valve body 150 is aligned for operation in the off mode, neither the main flow bore 160 nor the bypass flow bore 162 are aligned with the second gas port 118 so that the sealing member 168 prevents gas from flowing out of or into the second hub 126 and the second gas port 118.

Referring now to 5 and 6, the valve holding assembly 180 includes a lid 182 and a valve holding body 184 extending from the lid 182. In this exemplary embodiment, the valve holding assembly 180 is preferably made of a plastic material, such as polyethylene. The lid 182 is configured and dimensioned to fit within a recess 170 in the flow valve body 150 and to be releasably secured to the flow valve body 150. The lid 182 may be releasably secured to the flow valve body 150 using one or more mechanical fasteners 186. In the exemplary embodiment shown, the one or more mechanical fasteners 186 are machine screws that pass through mounting holes 172 in the lid 182 and are secured to threaded holes 174 in the recess 170 of the flow valve body 150. However, the present disclosure contemplates that the one or more mechanical fasteners 186 may be one or more clips or one or more cam lock mechanisms that are manipulated from the top of the lid 182. The lid 182 may include a handle 204 used to facilitate the installation of the flow valve body 150 into the valve seat housing 110, or to facilitate the removal of the flow valve body 150 from the valve seat housing 110.

Figure 14:
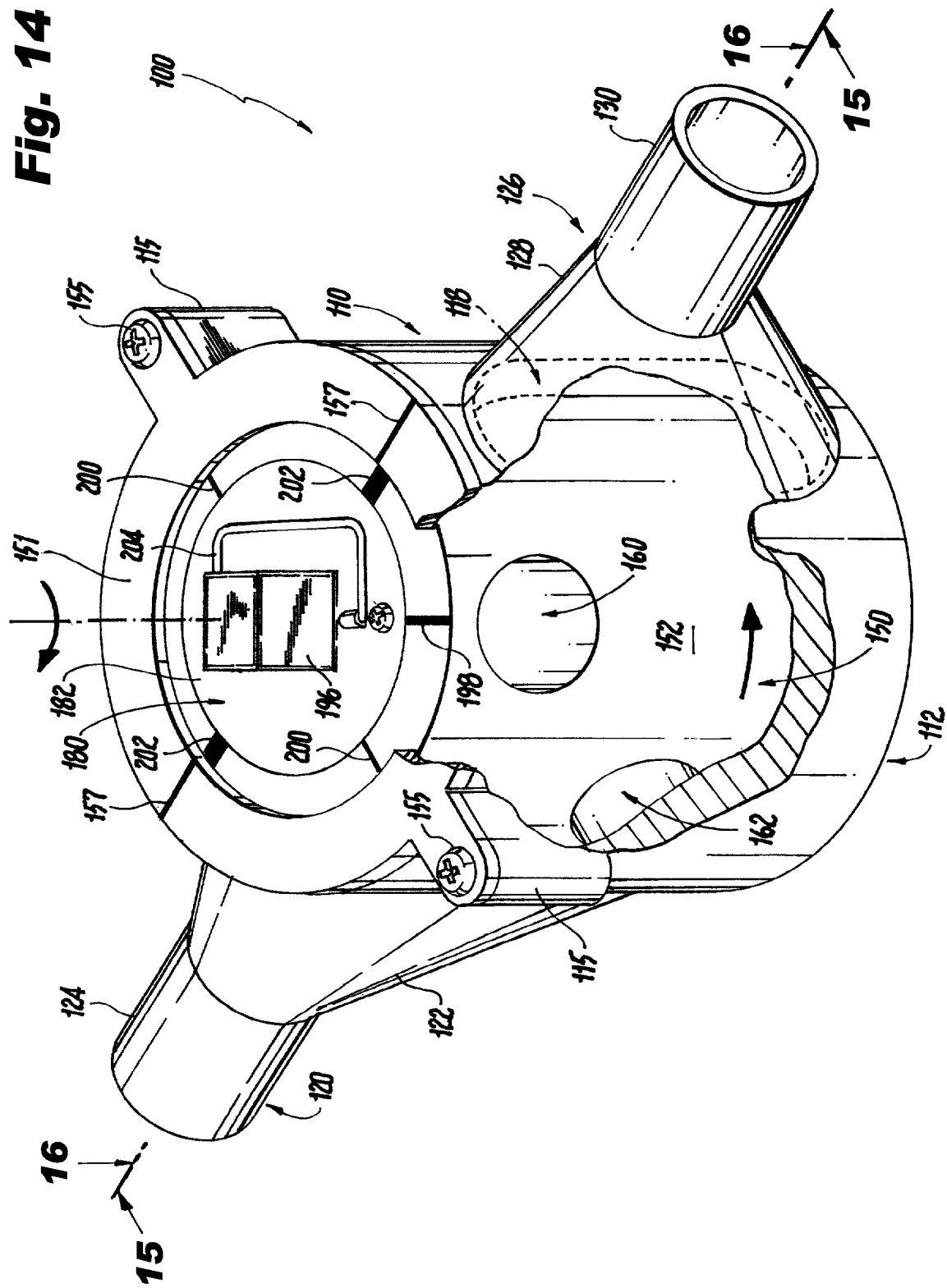
FIG. 14 is a perspective view of the gas valve assembly of FIG. 3 in partial cut away revealing the main flow bore and the bypass flow bore within the flow control body and the flow control body rotated and aligned for operation in an off mode.
Figure 15:
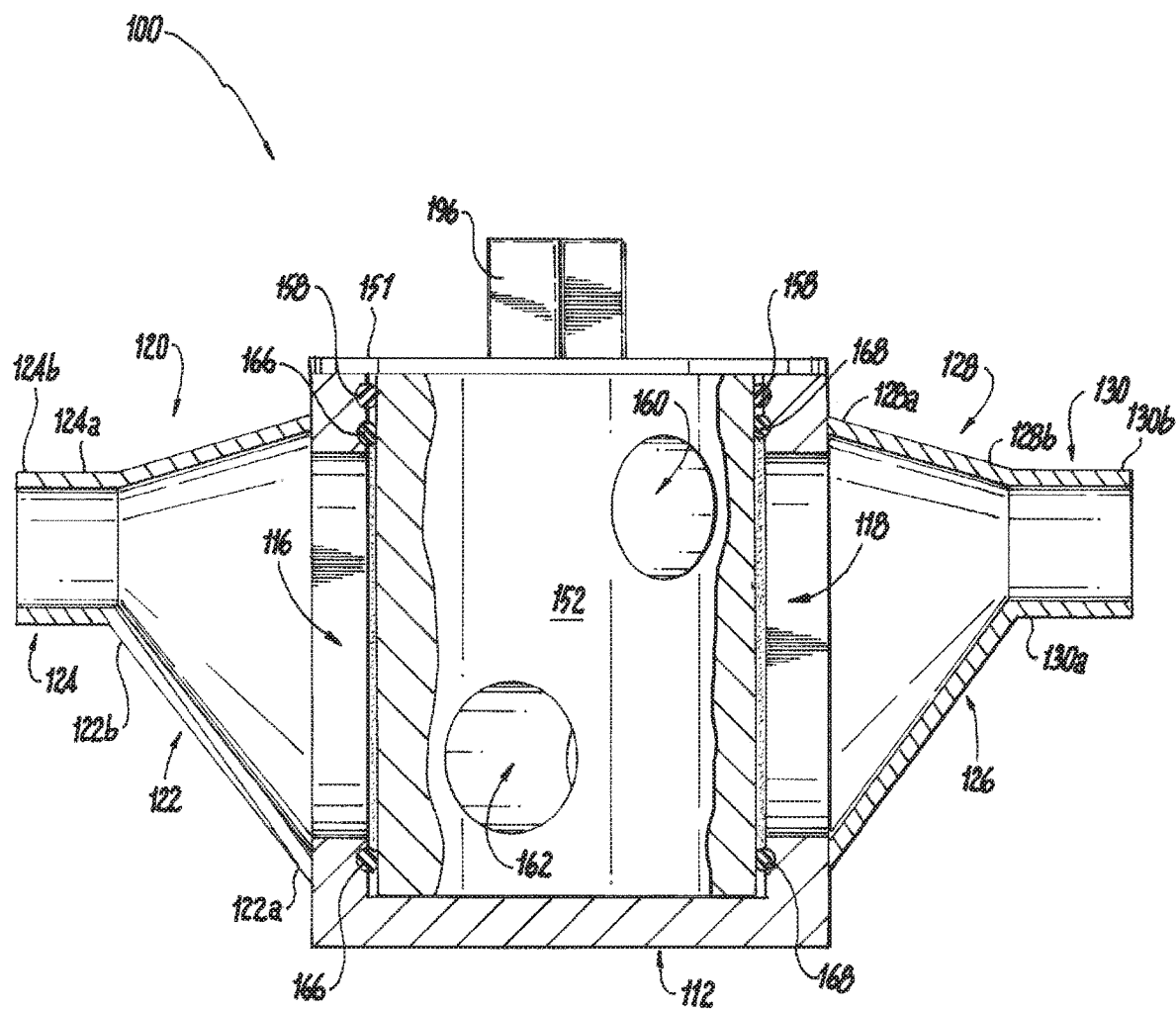
FIG. 15 is a cross-sectional view of the gas valve assembly of FIG. 14 taken from line 15-15, illustrating the main flow bore and the bypass flow bore within the flow control body and the flow control body rotated and aligned for operation in the off mode.
Figure 16:
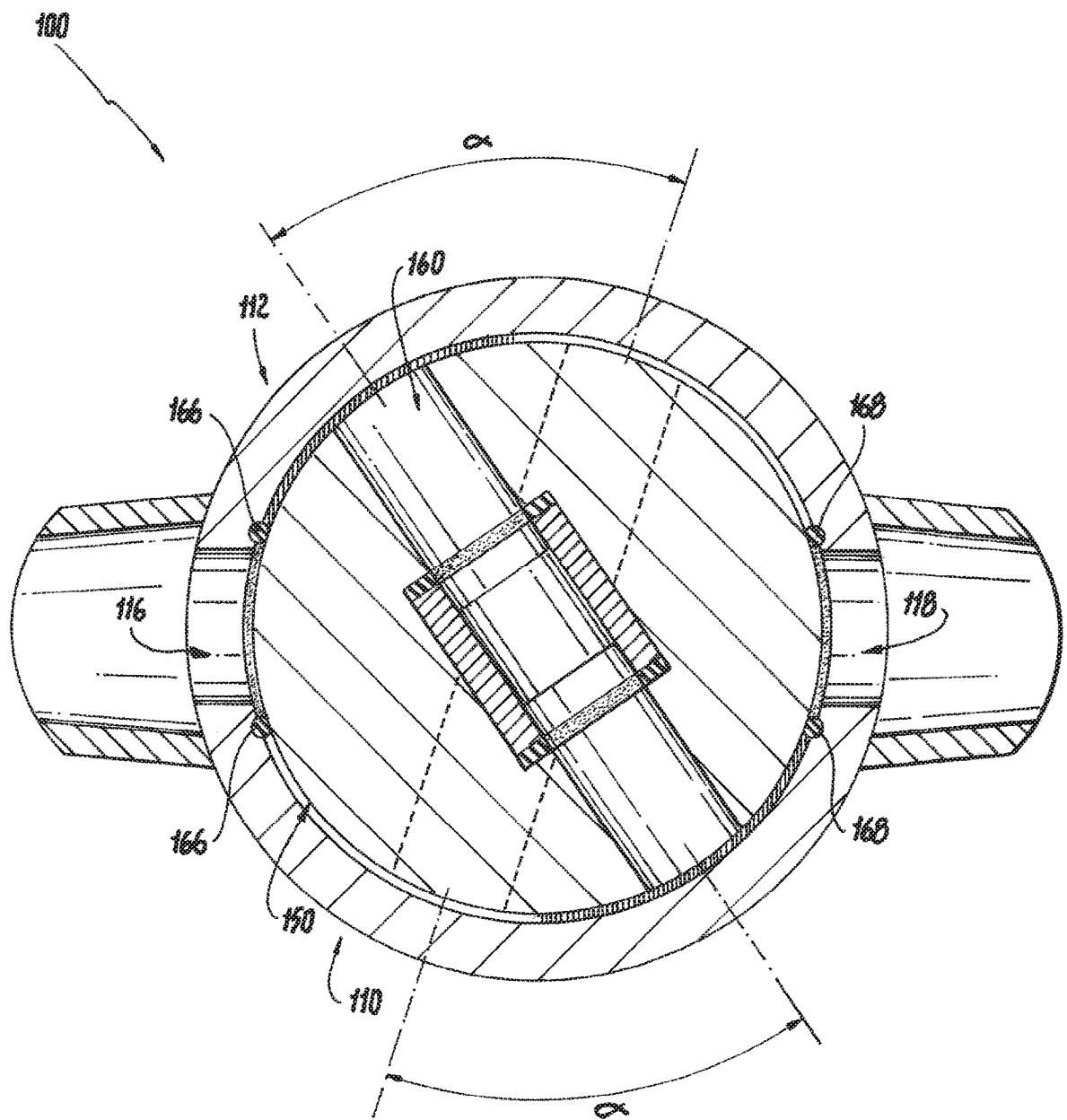
FIG. 16 is cross-sectional view of the gas valve assembly of FIG. 14 taken from line 16-16, illustrating the main flow bore and the bypass flow bore within the flow control body and the flow control body aligned for operation in the off mode.

Referring to FIGS. 3-7, the lid 182 includes a valve actuation member 196, such as a nut-like structure, that can be grasped with a tool and rotated to move the flow valve body 150 between the flow control mode, the bypass mode and the off mode. To determine which mode the flow valve body 150 is in, alignment indicia may be provided. For example, in the exemplary embodiment shown in FIGS. 3 and 4, a top surface of the flow valve body 150 can be provided with one or more main mode markers 198, one or more bypass mode markers 200 and one or more off mode markers 202. The one or more off mode markers 202 may be, for example, lines with a wide thickness, the one or more main mode markers 198 may be, for example, lines with an intermediate thickness, and the one or more bypass mode markers 200 may be, for example, lines with a narrow thickness, as shown in FIGS. 3 and 4. In addition, the cover ring 151 may include one or more alignment markers 157 positioned on the cover ring so that the alignment markers are in-line with a central axis of the first gas port 116 and/or the second gas port 118. In this configuration, when the flow valve body 150 is rotated within the valve seat housing 110 so that the main mode markers 198 are aligned with the alignment markers 157, the gas valve assembly 100 is aligned for operation in the flow control mode. Referring to FIGS. 10-13, when the flow valve body 150 is rotated within the valve seat housing 110 so that the bypass mode markers 200 are aligned with the alignment markers 157, the gas valve assembly 100 is aligned for operation in the bypass mode. Referring to FIGS. 14-16, when the flow valve body 150 is rotated within the valve seat housing 110 so that the off mode markers 202 are aligned with the alignment markers 157, the gas valve assembly 100 is aligned for operation in the off mode.

Referring again to FIGS. 5-7, the valve holding body 184 is configured and dimensioned to fit within the valve receptacle 164 in the flow valve body 150. In the exemplary embodiment shown in FIGS. 5 and 6, the valve holding body 184 is a square shaped member and the valve receptacle 164 is a square shaped receptacle. The valve holding body 184 includes an EFV bore 188 extending therethrough. The EFV bore 188 preferably has a diameter that is substantially the same as the diameter of the main flow bore 160. An excess flow valve 190 is positioned within the EFV bore 188 and is held in position within the EFV bore 188 by a friction force or by a gasket, O-ring or other stop member. To hold the excess flow valve 190 within the EFV bore 188 by a friction force, the diameter of the excess flow valve 190 is slightly larger than the diameter of the EFV bore 188. To ensure a gas tight seal between the valve holding body 184 and the valve receptacle 164 each side of the valve holding body 184 with the EFV bore 188 includes a sealing member 192 that prevents gas within the main flow bore 160 and the EFV bore 188 from leaking out of the junction between the lid 182 and the recess 170 of the flow valve body 150. To further ensure a gas tight seal between the valve holding body 184 and the valve receptacle 164, a sealing member 194 may be positioned between the valve receptacle 164 and the lid 182 that prevents any gas that may leak from the main flow bore 160 and the EFV bore 188 into the valve receptacle 164 from leaking out of the junction between the lid 182 and the recess 170 of the flow valve body 150. Non-limiting examples of the sealing members 192 and 194 include O-rings and gaskets.

Figure 17:
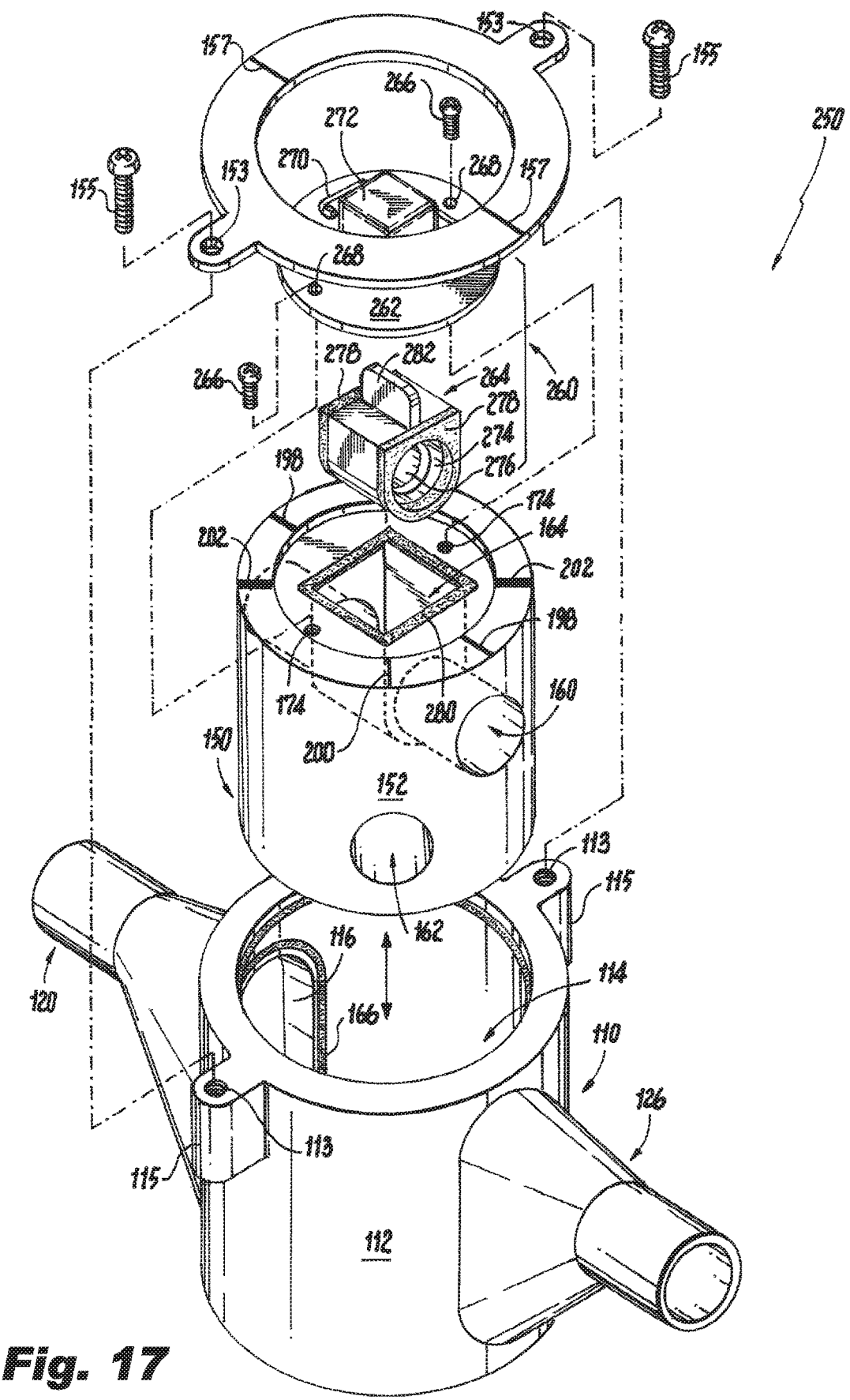
FIG. 17 is an exploded perspective view of another exemplary embodiment of the gas valve assembly according to the present disclosure, illustrating the valve seat housing, the flow control body, and another exemplary embodiment of the valve holding assembly that can be removably secured to the flow control body and that can hold an excess flow valve so that the excess flow valve is aligned with a main bore within the flow control body.

Referring now to FIG. 17, another exemplary embodiment of a valve assembly 250 according to the present disclosure is shown. The valve assembly 250 includes the valve seat housing 110 and the flow valve body 150 described above and for ease of description will not be repeated. However, it is noted that the valve receptacle 164 of the flow valve body 150 is shaped with a rounded bottom wall instead of a flat bottom wall, as shown. The valve assembly 250 also includes a valve holding assembly 260. In this exemplary embodiment, the valve holding assembly 260 includes a lid 262 and a valve holding body 264. The valve holding assembly 260 is preferably made of a plastic material, such as polyethylene.

The lid 262 is configured and dimensioned to fit within the recess 170 in the flow valve body 150 and to be releasably secured to the flow valve body. The lid 262 may be releasably secured to the flow valve body 150 using one or more mechanical fasteners 266. In the exemplary embodiment shown, the one or more mechanical fasteners 266 are machine screws that pass through mounting holes 268 in the lid 262 and are secured to threaded holes 174 in the recess 170 of the flow valve body 150. However, the present disclosure contemplates that the one or more mechanical fasteners 266 may be one or more clips or one or more cam lock mechanisms that are manipulated from the top of the lid 262. The lid 262 may include a handle 270 used to facilitate the installation of the flow valve body 150 into the valve seat housing 110, or to facilitate the removal of the flow valve body 150 from the valve seat housing 110. The lid 262 includes a valve actuation member 272, such as a nut-like structure, that can be grasped with a tool and rotated to move the flow valve body 150 between the flow control mode, the bypass mode and the off mode.

Continuing to refer to FIG. 17, the valve holding body 264 is configured and dimensioned to fit within the valve receptacle 164 in the flow valve body 150. In the exemplary embodiment shown, the valve holding body 264 is a square shaped member with a rounded bottom wall and the valve receptacle 164 has a rounded bottom wall as noted above. The valve holding body 264 includes an EFV bore 274 extending therethrough. The EFV bore 274 preferably has a diameter that is substantially the same as the diameter of the main flow bore 160. An excess flow valve 276 is positioned within or built directly into the EFV bore 274. If positioned within the EFV bore 274, the excess flow valve 276 can be held in position within the EFV bore by a friction force or by a gasket, O-ring or other stop member. With the excess flow valve 276 built directly into the valve holding body 264 replacement of the excess flow valve 276 is achieved by replacing the valve holding body 264.

To ensure a gas tight seal between the valve holding body 264 and the valve receptacle 164 each side of the valve holding body 264 with the EFV bore 274 includes a sealing member 278 that prevents gas within the main flow bore 160 and the EFV bore 274 from leaking out of the junction between the lid 262 and the recess 170 of the flow valve body 150. To further ensure a gas tight seal between the valve holding body 264 and the valve receptacle 164, a sealing member 280 may be positioned between the valve receptacle 164 and the lid 262 that prevents any gas that may leak from the main flow bore 160 and the EFV bore 274 into the valve receptacle 164 from leaking out of the junction between the lid 262 and the recess 170 of the flow valve body 150. Non-limiting examples of the sealing members 278 and 280 include O-rings and gaskets.

To facilitate the insertion and the removal of the valve holding body 264 from the valve receptacle 164, the valve holding body 264 may include an arm 282 extending from a top wall of the valve holding body 264. The arm 282 may also serve as a stop that is engaged by a bottom surface of the lid 262 when the lid is secured to the flow valve body 150 as described above. When the arm 282 is serving as a stop engaging the bottom surface of the lid 262 when the lid is secured to the flow valve body 150, the arm 282 helps to hold the valve holding body 264 within the valve receptacle 164.

Figure 18:
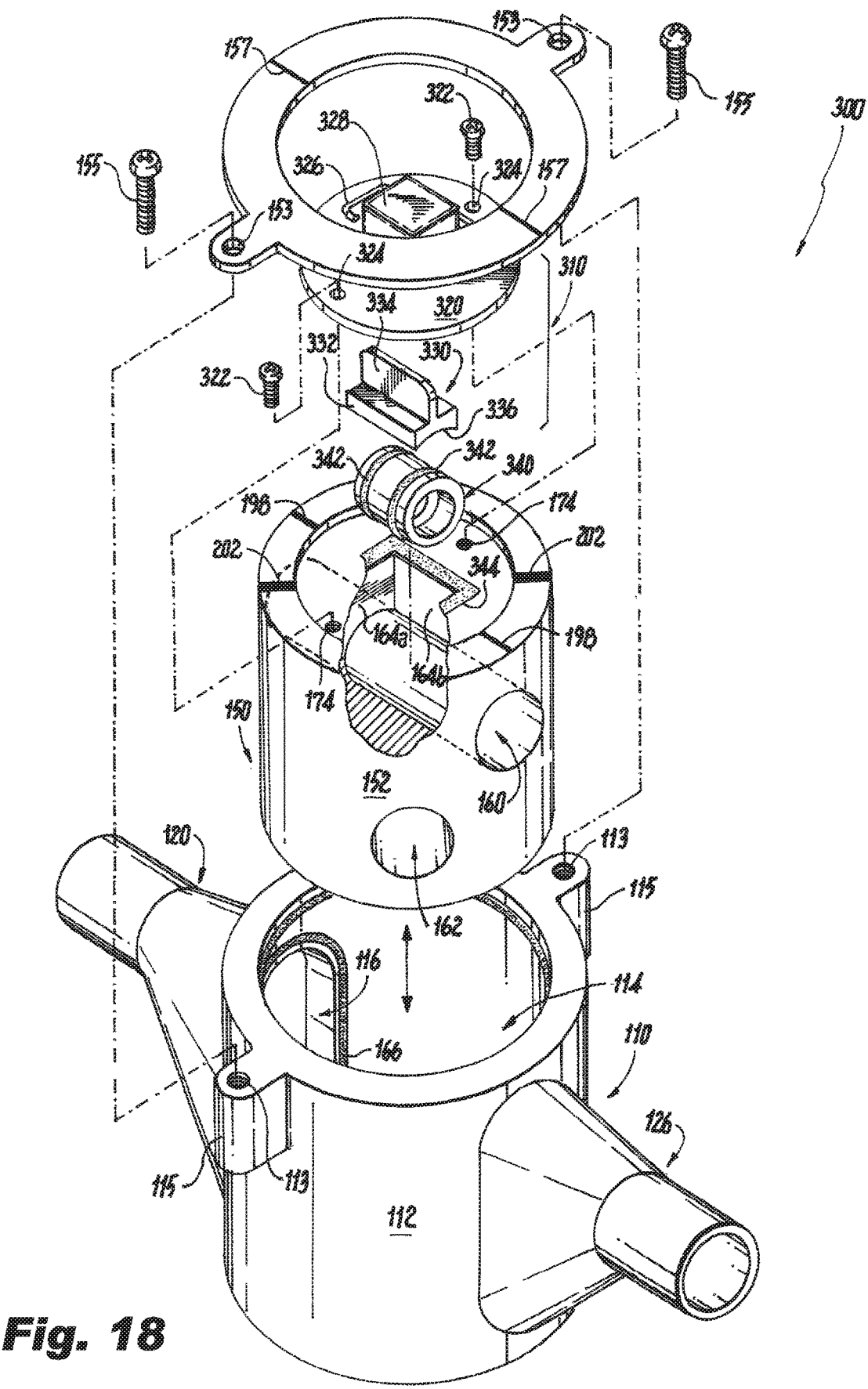
FIG. 18 is an exploded perspective view of another exemplary embodiment of the gas valve assembly according to the present disclosure, illustrating the valve seat housing, the flow control body, and another exemplary embodiment of the valve holding assembly that can be removably secured to the flow control body and that can hold an excess flow valve so that the excess flow valve is aligned with a main bore within the flow control body.

Referring now to FIG. 18, another exemplary embodiment of a valve assembly 300 according to the present disclosure is shown. The valve assembly 300 includes the valve seat housing 110 described above and for ease of description is not repeated. The valve assembly 300 also includes a flow valve body that is substantially similar to the flow valve body 150 described, except that the valve receptacle differs from the valve receptacle 164 described above. This difference will be described below in more detail. The valve assembly 300 also includes a valve holding assembly 310 that is preferably made of a plastic material, such as polyethylene.

In the exemplary embodiment of FIG. 18, the valve receptacle 164 of the flow valve body 150 is a channel, e.g., a rectangular channel, bordered by a pair of short walls 164*a* and a pair of long walls 164*b* that end at the main flow bore 160 and conform to the shape of the main flow bore 160 so that an excess flow valve 340 may be positioned within the main flow bore 160.

The valve holding assembly 310 includes a lid 320 and a valve holding body 330. The lid 320 is configured and dimensioned to fit within the recess 170 in the flow valve body 150 and to be releasably secured to the flow valve body. The lid 320 may be releasably secured to the flow valve body 150 using one or more mechanical fasteners 322. In the exemplary embodiment shown, the one or more mechanical fasteners 322 are machine screws that pass through mounting holes 324 in the lid 320 and are secured to threaded holes 174 in the recess 170 of the flow valve body 150. However, the present disclosure contemplates that the one or more mechanical fasteners 322 may be one or more clips or one or more cam lock mechanisms that are manipulated from the top of the lid 320. The lid 320 may include a handle 326 used to facilitate the installation of the flow valve body 150 into the valve seat housing 110, or to facilitate the removal of the flow valve body 150 from the valve seat housing 110. The lid 320 includes a valve actuation member 328, such as a nut-like structure, that can be grasped with a tool and rotated to move the flow valve body 150 between the flow control mode, the bypass mode and the off mode.

The valve holding body 330 is configured and dimensioned to fit within the valve receptacle 164 in the flow valve body 150, and to conform to the shape of the valve receptacle 164 to help facilitate a gas tight seal between an excess flow valve 340 positioned within the main flow bore 160 and the junction between the lid 320 and the flow valve body 150. The valve holding body 330 includes a base 332 and an arm 334 extending from a top side of the base as shown. A bottom side of the base 332, which is opposite the side having the arm 334, has an arcuate surface 336 configured to form the shape of the outer periphery of the excess flow valve 340. To ensure a gas tight seal between the excess flow valve 340, the valve holding body 330 and the valve receptacle 164, each end of the excess flow valve 340 includes a sealing member 342 that prevents gas within the main flow bore 160 from leaking out of the junction between the lid 320 and the recess 170 of the flow valve body 150. To further ensure a gas tight seal between the valve holding body 330 and the valve receptacle 164, a sealing member 344 may be positioned between the valve receptacle 164 and the lid 320 that prevents any gas that may leak from the main flow bore 160 into the valve receptacle 164 from leaking out of the junction between the lid 320 and the recess 170 of the flow valve body 150. Non-limiting examples of the sealing members 342 and 344 include O-rings and gaskets.

The arm 334 facilitates the insertion and the removal of the valve holding body 330 from the valve receptacle 164. The arm 334 may also serve as a stop that is engaged by a bottom surface of the lid 320 when the lid is secured to the flow valve body 150 as described above. When the arm 334 is serving as a stop engaging the bottom surface of the lid 320 when the lid is secured to the flow valve body 150, the arm 334 helps to hold the valve holding body 330 within the valve receptacle 164.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A gas valve assembly comprising:
  a valve seat housing having a wall and a central opening, and including:
    a first hub extending from the wall of the valve seat housing and having an opening extending therethrough;
    a first gas port extending through the wall of the valve seat housing aligned with the first hub opening so that the central opening is in communication with the first hub opening;
    a second hub extending from the wall of the valve seat housing and having an opening extending therethrough;
    a second gas port extending through the wall of the valve seat housing aligned with the second hub opening so that the central opening is in communication with the second hub opening;
  a flow valve body within the central opening of the valve seat housing, the flow valve body having a main flow bore extending therethrough and a bypass bore extending therethrough, wherein the main flow bore is angularly displaced from the bypass flow bore; and
  valve holding assembly having a lid releasably secured to the flow valve body and a valve holding body extending from the lid into a valve receptacle within the flow valve body, the valve holding body having an excess flow valve removably positioned within an EFV bore within the valve holding body.

2. The gas valve assembly according to claim 1, further comprising a cover ring releasably securing the flow valve body within the central opening of the valve seat housing.

3. The gas valve assembly according to claim 2, wherein the cover ring includes at least one alignment marker, and wherein the flow valve body includes at least one main mode marker and at least one bypass mode marker, such that when the at least one main mode marker is aligned with the at least one alignment marker the gas valve assembly is aligned for operation in a flow control mode and when the at least one bypass mode marker is aligned with the at least one alignment marker the gas valve assembly is aligned for operation in a bypass mode.

4. The gas valve assembly according to claim 3, wherein when the at least one main mode marker and the at least one bypass mode marker are not aligned with the at least one alignment marker the gas valve assembly is aligned for operation in an off mode.

5. The gas valve assembly according to claim 3, wherein the flow valve body includes at least one off mode marker such that when the at least one off mode marker is aligned with the at least one alignment marker the gas valve assembly is aligned for operation in an off mode.

6. The gas valve assembly according to claim 1, wherein the first hub and second hub are integrally or monolithically formed into the valve seat housing.

7. The gas valve assembly according to claim 1, wherein the EFV bore is aligned with the main flow bore.

8. The gas valve assembly according to claim 1, wherein the main flow bore is angularly displaced from the bypass flow bore within the range of 50 degrees and 70 degrees.

9. A gas valve assembly comprising:
  a valve seat housing having a wall and a central opening, and including:
    a first hub integrally or monolithically formed into the wall of the valve seat housing and having an opening extending therethrough;
    a first gas port extending through the wall of the valve seat housing aligned with the first hub opening so that the central opening is in communication with the first hub opening;
    a second hub integrally or monolithically formed into the wall of the valve seat housing and having an opening extending therethrough;
    a second gas port extending through the wall of the valve seat housing aligned with the second hub opening so that the central opening is in communication with the second hub opening; and
  a flow valve body within the central opening of the valve seat housing, the flow valve body having a main flow bore extending therethrough, a bypass bore extending therethrough and a removable excess flow valve positioned within main flow bore, wherein the main flow bore is angularly displaced from the bypass flow bore.

10. The gas valve assembly according to claim 9, further comprising a cover ring releasably securing the flow valve body within the central opening of the valve seat housing.

11. The gas valve assembly according to claim 10, wherein the cover ring includes at least one alignment marker, and wherein the flow valve body includes at least one main mode marker and at least one bypass mode marker, such that when the at least one main mode marker is aligned with the at least one alignment marker the gas valve assembly is aligned for operation in a flow control mode and when the at least one bypass mode marker is aligned with the at least one alignment marker the gas valve assembly is aligned for operation in a bypass mode.

12. The gas valve assembly according to claim 11, wherein when the at least one main mode marker and the at least one bypass mode marker are not aligned with the at least one alignment marker the gas valve assembly is aligned for operation in an off mode.

13. The gas valve assembly according to claim 11, wherein the flow valve body includes at least one off mode marker such that when the at least one off mode marker is aligned with the at least one alignment marker the gas valve assembly is aligned for operation in an off mode.

14. The gas valve assembly according to claim 9, wherein the main flow bore is angularly displaced from the bypass flow bore within the range of 50 degrees and 70 degrees.

15. A gas valve assembly comprising:
a valve seat housing having a wall and a central opening, and including:
a first gas port extending through the wall of the valve seat housing;
a second gas port extending through the wall of the valve seat housing; and
a flow valve body within the central opening of the valve seat housing, the flow valve body having a main flow bore extending therethrough, a bypass bore extending therethrough and a removable excess flow valve positioned within main flow bore, wherein the main flow bore is angularly displaced from the bypass flow bore.

16. The gas valve assembly according to claim 15, further comprising a valve holding assembly having a lid releasably secured to the flow valve body and a valve holding body extending from the lid into a valve receptacle within the flow valve body, the valve holding body having the excess flow valve removably positioned within an EFV bore within the valve holding body.

17. The gas valve assembly according to claim 15, further comprising a cover ring releasably securing the flow valve body within the central opening of the valve seat housing.

18. The gas valve assembly according to claim 17, wherein the cover ring includes at least one alignment marker, and wherein the flow valve body includes at least one main mode marker and at least one bypass mode marker, such that when the at least one main mode marker is aligned with the at least one alignment marker the gas valve assembly is aligned for operation in a flow control mode and when the at least one bypass mode marker is aligned with the at least one alignment marker the gas valve assembly is aligned for operation in a bypass mode.

19. The gas valve assembly according to claim 18, wherein when the at least one main mode marker and the at least one bypass mode marker are not aligned with the at least one alignment marker the gas valve assembly is aligned for operation in an off mode.

20. The gas valve assembly according to claim 18, wherein the flow valve body includes at least one off mode marker such that when the at least one off mode marker is aligned with the at least one alignment marker the gas valve assembly is aligned for operation in an off mode.

21. The gas valve assembly according to claim 15, wherein the main flow bore is angularly displaced from the bypass flow bore within the range of 50 degrees and 70 degrees.

* * * * *